(12) United States Patent
Sung et al.

(10) Patent No.: US 11,870,928 B2
(45) Date of Patent: Jan. 9, 2024

(54) MOUNTING APPARATUS FOR DISPLAYING SCREEN OF ELECTRONIC APPARATUS THROUGH HOLOGRAM

(71) Applicant: SAMSUNG ELECTRONICS CO., LTD., Suwon-si (KR)

(72) Inventors: Wonkyu Sung, Suwon-si (KR); Bonghak Choi, Suwon-si (KR); Dongjin Lee, Suwon-si (KR); Hanchul Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/943,835

(22) Filed: Sep. 13, 2022

(65) Prior Publication Data

US 2023/0007116 A1 Jan. 5, 2023

Related U.S. Application Data

(63) Continuation of application No. PCT/KR2021/003445, filed on Mar. 19, 2021.

(30) Foreign Application Priority Data

Mar. 19, 2020 (KR) ........................ 10-2020-0033555

(51) Int. Cl.
*G03H 1/04* (2006.01)
*H04M 1/72409* (2021.01)
(Continued)

(52) U.S. Cl.
CPC ...... *H04M 1/72409* (2021.01); *G06F 1/1632* (2013.01); *G06F 3/041* (2013.01); *G06F 3/14* (2013.01); *H02J 50/10* (2016.02)

(58) Field of Classification Search
CPC .................................................... G06F 1/1639
See application file for complete search history.

(56) References Cited

U.S. PATENT DOCUMENTS 10,962,778 B2 * 3/2021 Lapidot .............. G02B 27/0149
11,258,890 B2 * 2/2022 Griffith ................. G03B 21/28
(Continued)

FOREIGN PATENT DOCUMENTS

| KR | 10-2013-0076479 | 7/2013 |
| KR | 10-2014-0090836 | 7/2014 |

(Continued)

*Primary Examiner* — Sepehr Azari
(74) *Attorney, Agent, or Firm* — Nixon & Vanderhye P.C.

(57) ABSTRACT

A mounting apparatus may include: a mounting part on which a part of an external electronic apparatus is mounted; a film part connected to the mounting part; a near field wireless communication module; and a processor, wherein the processor may be configured to: detect a mounting state of the external electronic apparatus; determine whether the mounted external electronic apparatus is an apparatus supporting a holographic mode; and on the basis of the determined result, control to transmit a transmission signal to the external electronic apparatus by using the near field wireless communication module so that the external electronic apparatus outputs a hologram content by using at least a part of a display of the external electronic apparatus, and the hologram content output by the external electronic apparatus can be projected on the film part. Various other embodiments may be possible.

16 Claims, 23 Drawing Sheets

(51) Int. Cl.
  *G06F 3/041* (2006.01)
  *G06F 1/16* (2006.01)
  *G06F 3/14* (2006.01)
  *H02J 50/10* (2016.01)

(56) References Cited

U.S. PATENT DOCUMENTS

| | | | |
|---|---|---|---|
| 2012/0200495 A1* | 8/2012 | Johansson | H04N 13/302 |
| | | | 345/156 |
| 2012/0300275 A1* | 11/2012 | Vilardell | G06F 1/1637 |
| | | | 359/443 |
| 2013/0026973 A1 | 1/2013 | Luke et al. | |
| 2013/0187950 A1* | 7/2013 | Nowatzyk | G02B 27/4205 |
| | | | 345/3.1 |
| 2014/0143933 A1 | 5/2014 | Low et al. | |
| 2015/0025194 A1 | 1/2015 | Peuranen et al. | |
| 2015/0116454 A1 | 4/2015 | Kim et al. | |
| 2018/0152550 A1* | 5/2018 | Dharmatilleke | H04N 23/55 |
| 2020/0213433 A1* | 7/2020 | Griffith | G03B 21/10 |
| 2022/0404536 A1* | 12/2022 | Griffith | G06F 3/011 |

FOREIGN PATENT DOCUMENTS

| | | |
|---|---|---|
| KR | 10-2016-0131876 | 11/2016 |
| KR | 10-2017-0062266 | 6/2017 |
| KR | 10-2017-0124220 | 11/2017 |
| WO | 2016/182503 | 11/2016 |
| WO | 2017/146314 | 8/2017 |

\* cited by examiner

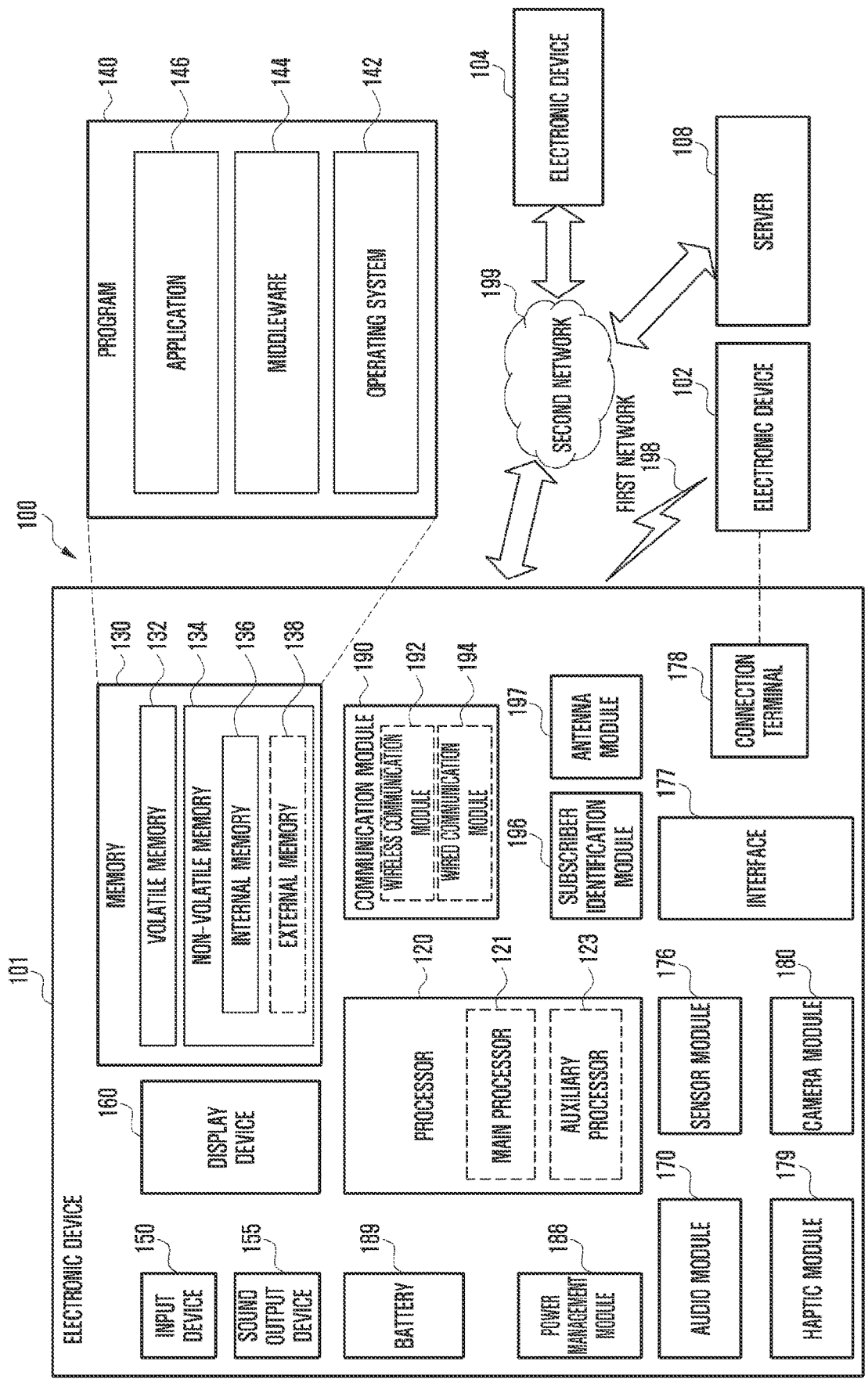

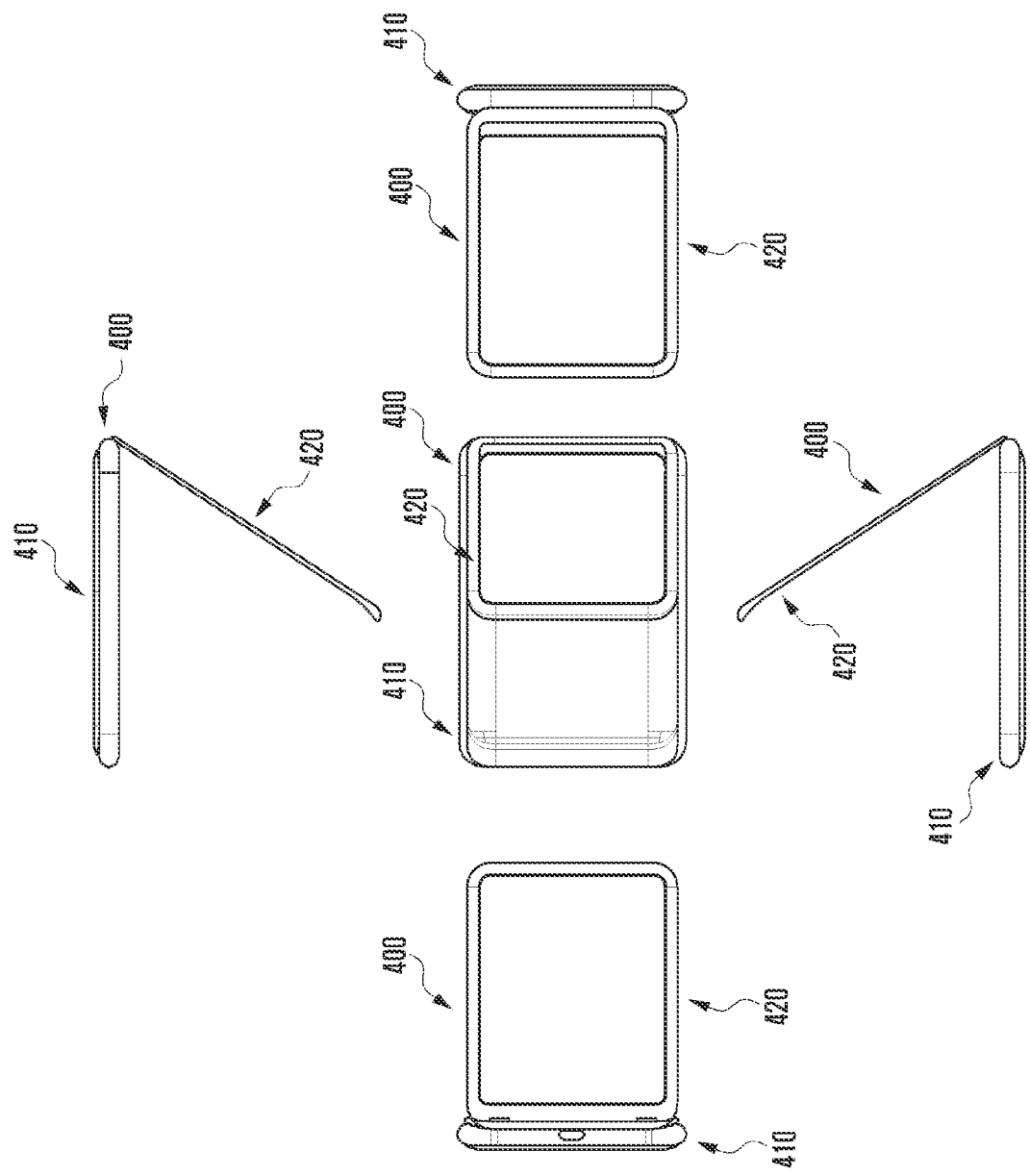

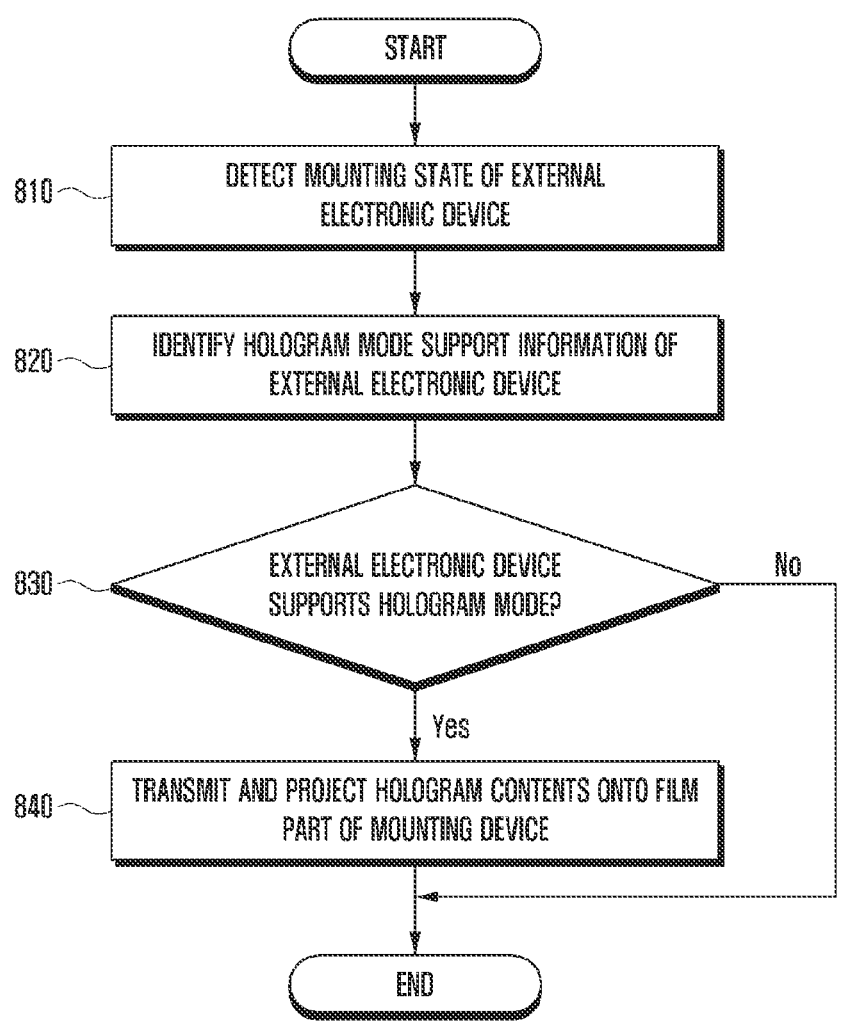

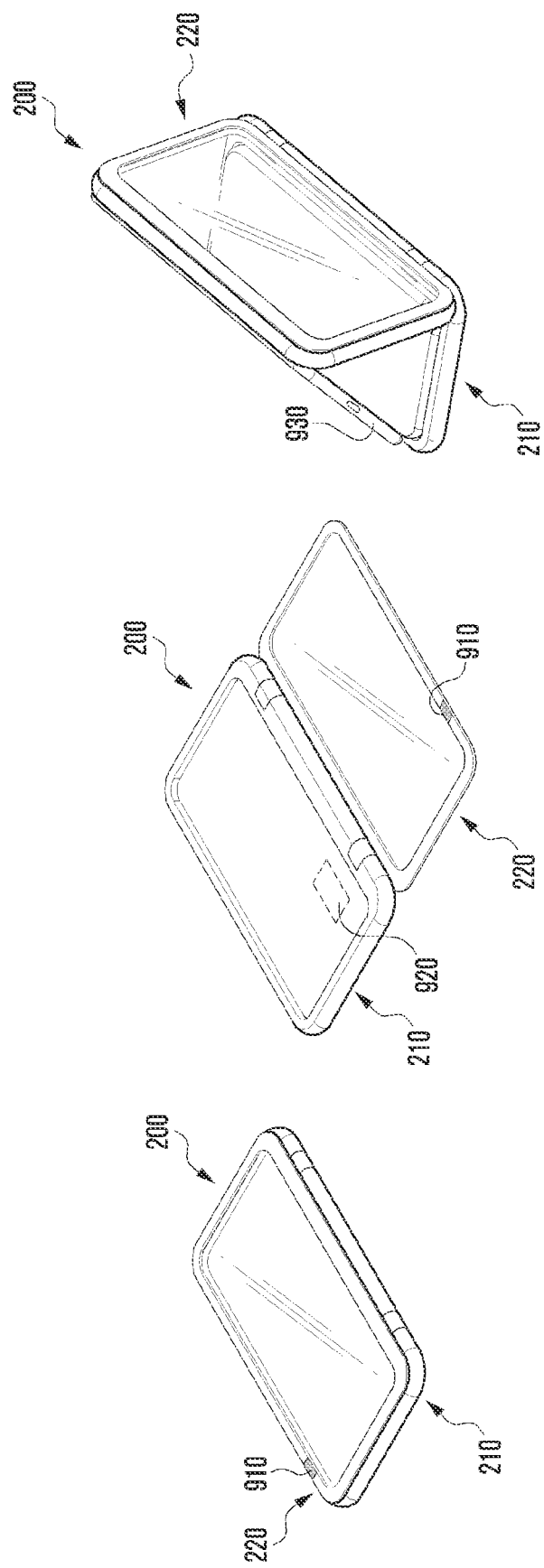

FIG. 11A
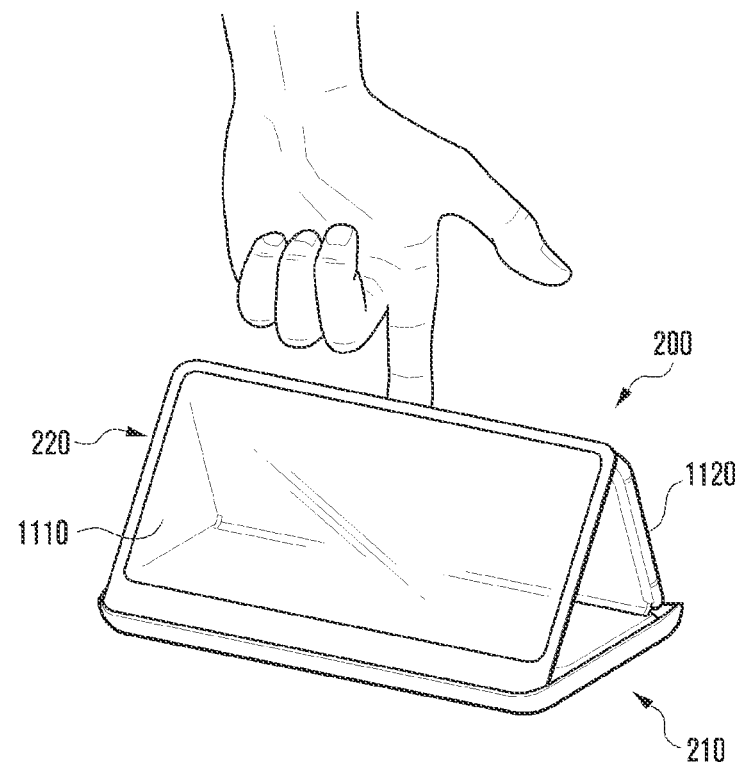
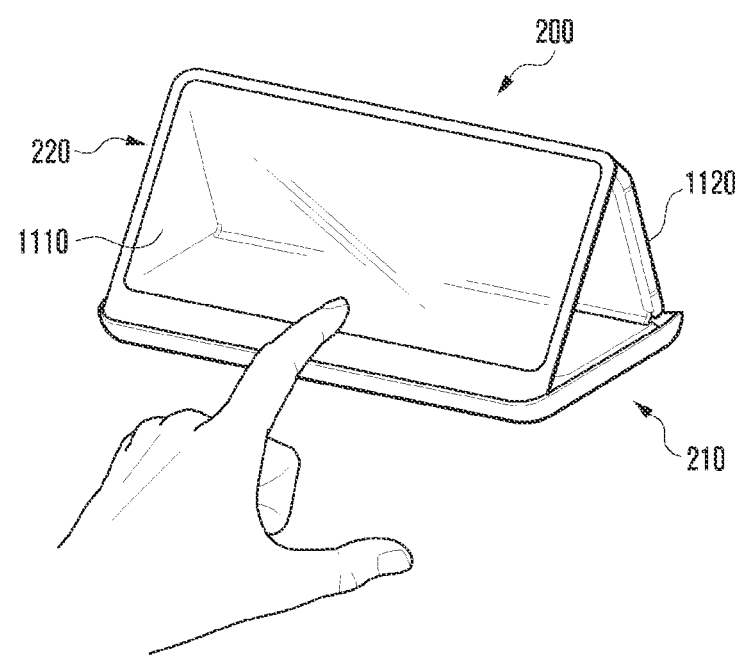

FIG. 14
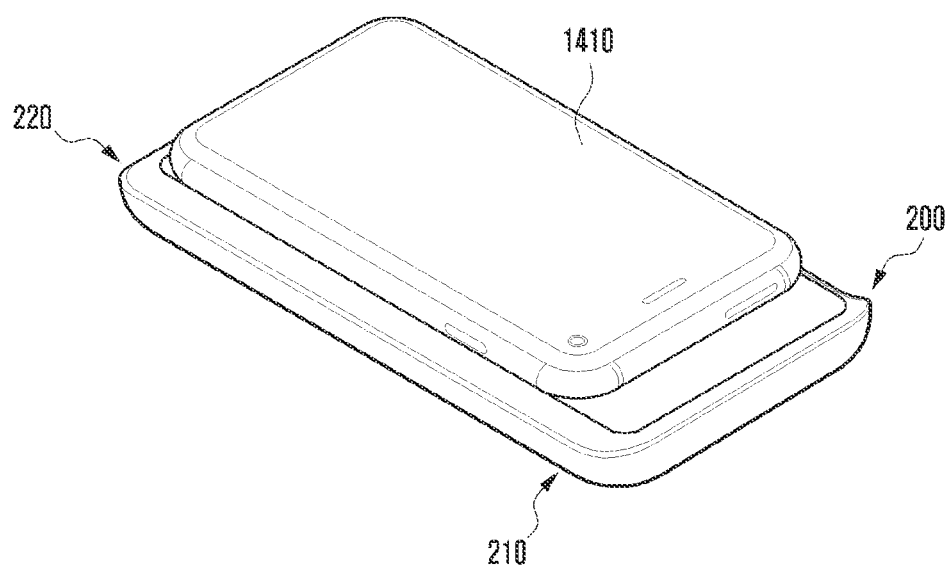
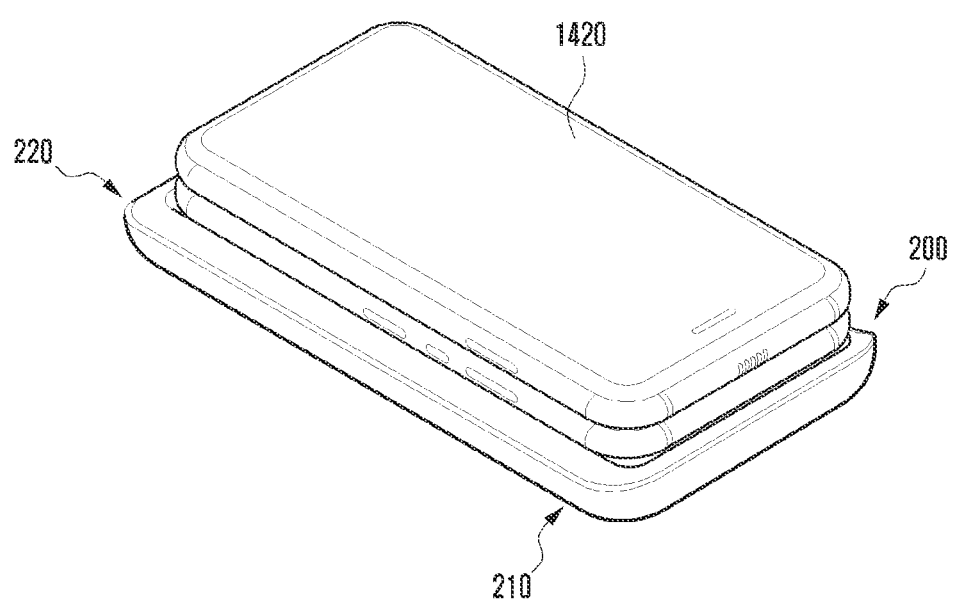

FIG. 15
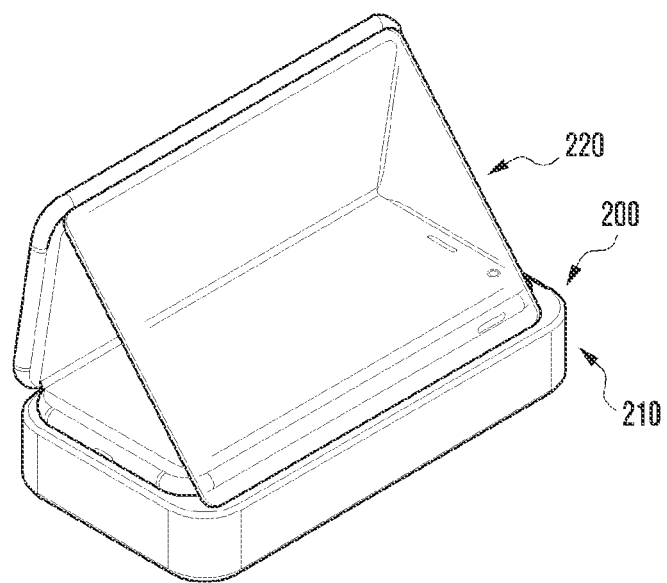
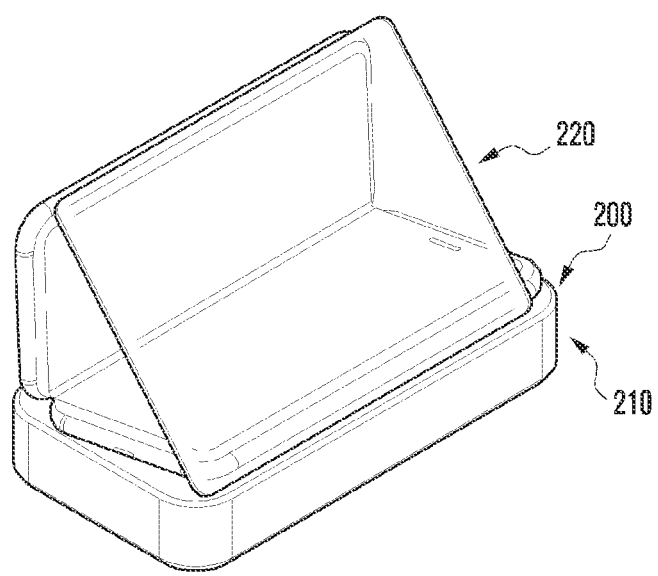

MOUNTING APPARATUS FOR DISPLAYING SCREEN OF ELECTRONIC APPARATUS THROUGH HOLOGRAM

CROSS-REFERENCE TO RELATED APPLICATIONS

This application is a continuation of International Application No. PCT/KR2021/003445 designating the United States, filed on Mar. 19, 2021, in the Korean Intellectual Property Receiving Office and claiming priority to Korean Patent Application No. 10-2020-0033555, filed on Mar. 19, 2020 in the Korean Intellectual Property Office, the disclosures of which are hereby incorporated by reference herein in their entireties.

FIELD

Various example embodiments relate to a mounting device for displaying a screen of an electronic device through a hologram.

BACKGROUND

A portable electronic device (hereinafter referred to as 'electronic device') typified by a smartphone has evolved and now can be equipped with a variety of functions. The electronic device may be coupled to various mounting devices to allow a user's easy access while charging.

The electronic device is being transfigured into various shapes beyond a traditional bar shape. Recently, various types of experiences can be provided, such as a form with a flexible display, a form with a foldable display, and a form with two or more displays by combining with a mounting device. The electronic device having such a display may provide, in a bent or folded state for charging in combination with a mounting device or the like, an environment allowing the user to utilize the electronic device.

In order to simultaneously perform mounting and charging of the electronic device, a typical mounting device requires the electronic device to be placed on a predetermined position of the mounting device.

The electronic device having a foldable display or two or more displays operates in a manner of folding a housing structure, so it can be mounted on the mounting device in a folded state. When the electronic device of in-folding type is mounted on the mounting device in a folded state, there is a problem in that a narrow space must be used to utilize the folded display of the electronic device in a mounting state.

SUMMARY

According to various example embodiments, a mounting device may include a mounting part on which a part of an external electronic device is mounted, a film part connected (directly or indirectly) to the mounting part, a short-range wireless communication module (including communication circuitry), and a processor. The processor (including processing circuitry) may be configured to detect a mounting state of the external electronic device, to identify whether the mounted external electronic device is a device supporting a hologram mode, and to, based on the identified result, control to transmit a transmission (e.g., control) signal to the external electronic device by using the short-range wireless communication module so that the external electronic device outputs a hologram content by using at least a portion of a display of the external electronic device. The hologram content outputted by the external electronic device may be projected on the film part.

According to various example embodiments, the external electronic device may include at least one display, and at least one housing provided with the display. A first portion of the housing may be placed on the part of the mounting device, and a second portion of the housing may be coupled to the film part of the mounting device.

According to various example embodiments, an electronic device may include a display, a wireless communication module comprising communication circuitry and/or at least one antenna, a sensor module comprising at least one sensor, a processor, and a memory operatively connected to the processor. The processor may be configured to identify a result of detecting through the sensor module that the electronic device is folded at a predetermined angle and mounted on a mounting device, or identify a result of detecting through the sensor module that a part of the electronic device is attached to a magnet included in the mounting device, to transmit support information to the mounting device through the wireless communication module upon receiving a signal for identifying whether the electronic device supports the hologram mode, from the mounting device through the wireless communication module, and to display a hologram content on first and second regions of the display to be projected onto a film part of the mounting device upon receiving a hologram content transmission signal from the mounting device through the wireless communication module.

According to various example embodiments, the mounting device allows a foldable electronic device or an electronic device having two or more displays and mountable in a folded form to be used in a mounting state, thereby providing a user with a variety of experiences.

According to various example embodiments, the mounting device can provide a user with a hologram display by executing various applications usable in a mounted electronic device.

BRIEF DESCRIPTION OF DRAWINGS

The above and other aspects, features, and advantages of certain embodiments of the present disclosure will be more apparent from the following detailed description, taken in conjunction with the accompanying drawings, in which:

FIG. 1 is a block diagram of an electronic device in a network environment according to various example embodiments.

FIG. 4B shows a set of six views of a mounting device in an unfolding state according to various example embodiments.

FIG. 8 is a flowchart for executing a hologram mode of a mounting device according to various example embodiments.

FIG. 9B is an exemplary diagram illustrating that for mounting a partial region of an external electronic device is attached to a magnet included in a mounting device according to various example embodiments.

FIG. 11A is an exemplary diagram illustrating hologram contents control through a touch sensor included in a film part of a mounting device according to various example embodiments.

FIG. 14 is an exemplary diagram illustrating charging of an electronic device through a wireless charging module included in a part of a mounting device according to various example embodiments.

FIG. 15 is an exemplary diagram illustrating mounting check of an external electronic device using a weight sensor included in a part of a mounting device according to various example embodiments.

DETAILED DESCRIPTION

Figure 2A:
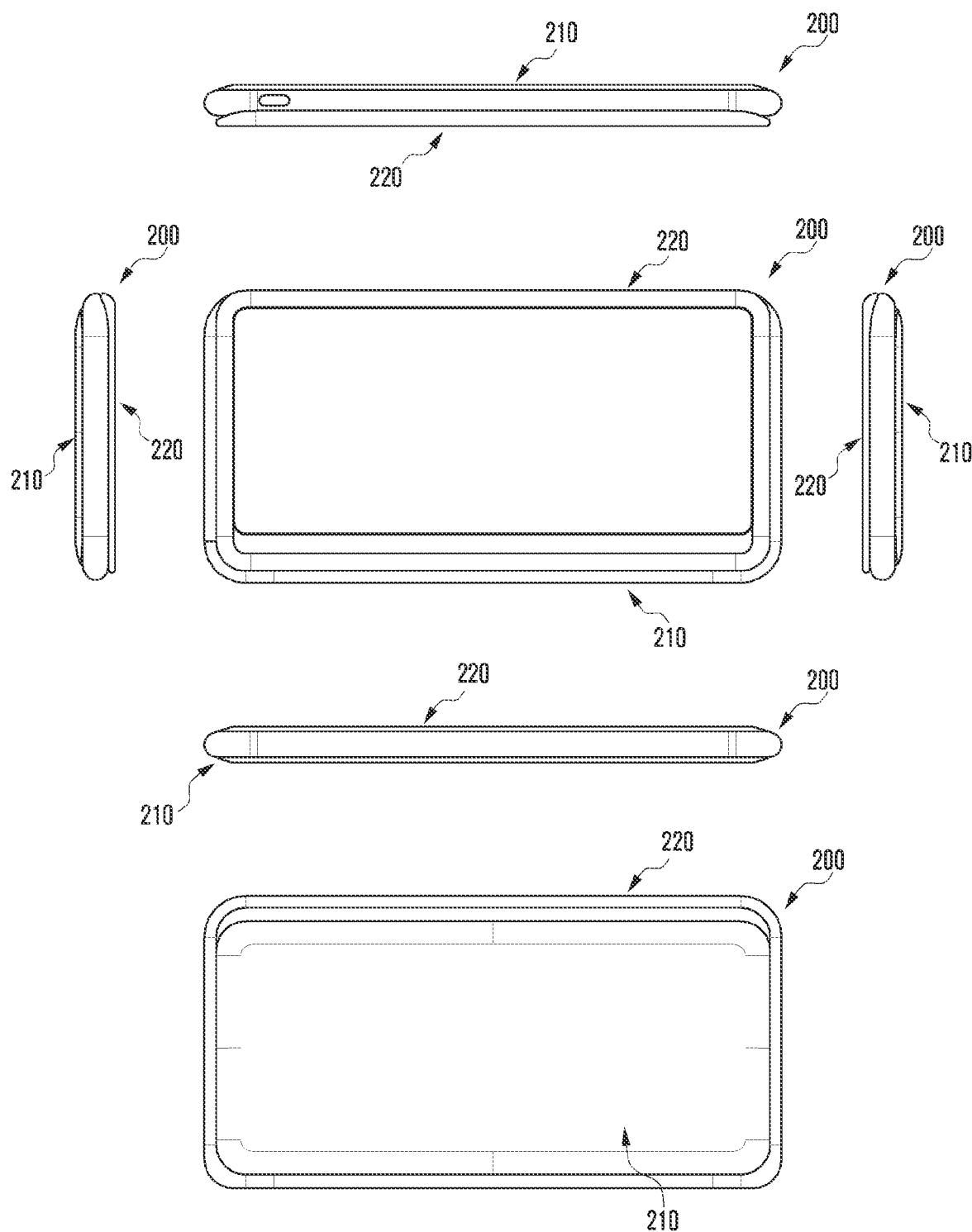
FIG. 2A shows a set of six views of a mounting device in a folding state according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIG. 2A shows a set of six views of a mounting device in a folding state according to various embodiments.

With reference to FIG. 2A, the mounting device 200 according to various embodiments may include a mounting part 210 and a film part 220 and may include, at least in part, the structure and/or function of the electronic device 101 of FIG. 1. The mount device may be designed such that the mounting part 210 and the film part 220 are connected (directly or indirectly) by at least a hinge structure and thereby the mounting device is foldable.

According to various embodiments, the mounting part 210 may have any shape as long as it has a structure of allowing an external electronic device to be placed and mounted. With reference to FIG. 2A, the mounting part may allow a portion or all of the external electronic device to be placed, and may also include a wireless charging module comprising charging circuitry. In case that the wireless charging module is included in the mounting part to provide wireless charging to the mounted external electronic device, any scheme capable of wirelessly charging the external electronic device, such as a magnetic induction scheme or a magnetic resonance scheme, may be available.

With reference to FIG. 2A, the film part 220 may allow hologram contents of the external electronic device mounted on the mounting device to be projected and displayed in the form of a hologram. According to an embodiment, the film part may be coupled or attached to a partial region of a housing of the external electronic device or a partial region of the external electronic device.

With reference to FIG. 2A, in the folding state, the external electronic device may be placed on the film part. For example, in case that the mounting part includes a wireless charging module, if the mounting device is folded, the external electronic device may be mounted or placed on the film part in a state where the mount part and the film part are overlapped.

With reference to FIG. 2A, depending on whether the state of the mounting device 200 is an opened (or open) state or a closed (or close) state, the angle or distance between the mounting part 210 and the film part 220 may vary. For example, the closed state may refer to a close state, a folding state, or a folded state.

The closed state of the mount device 200 is a state in which the mounting part 210 and the film part 220 are disposed to overlap with each other, and may refer to a state where the mount device is completely folded. In the closed state of the mounting device, the angle between the mounting part and the film part forms a narrow angle (e.g., 0 to 5 degrees), and the mounting part and the film part may face each other. FIG. 2A shows a set of six views, e.g., a front view, a rear view, a left view, a right view, a top view, and a bottom view in the closed state of the mounting device.

Hereinafter, an example that the external electronic device or electronic device mounted on the mounting device is implemented in an in-folding scheme will be described, but the following may be equally or similarly applied to the electronic device implemented in an out-folding scheme. In addition, the external electronic device or electronic device mounted on the mounting device may have a structure having a housing arranged left and right with respect to a folding axis and/or a structure having a housing arranged up and down with respect to a folding axis, and the folding axis may be two or more.

Also, although not shown in FIG. 2A, the mounting device 200 may include a magnet inside a partial region of the mounting part 210 and/or the film part 220.

Figure 2B:
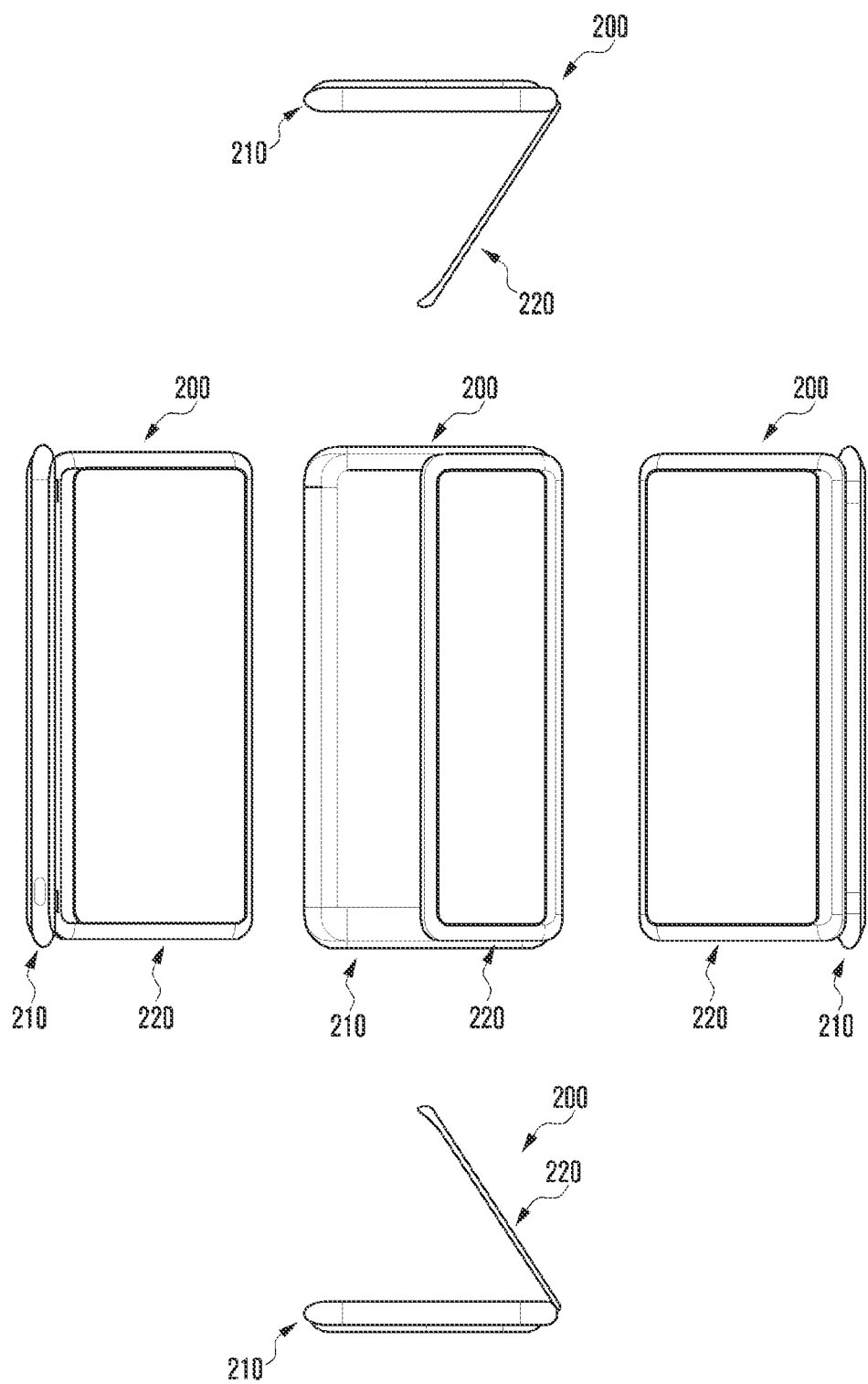
FIG. 2B shows a set of six views of a mounting device in an unfolding state according to various example embodiments.

FIG. 2B shows a set of six views of a mounting device in an unfolding state according to various embodiments.

With reference to FIGS. 2A and 2B, the mounting device 200 according to various embodiments may exist in the unfolding state with the film part 220 fixed, and the mounting part 210 and the film part 220 may be connected (directly or indirectly) to each other in a hinge structure.

With reference to FIG. 2B, depending on whether the state of the mounting device 200 is an opened (or open) state or a closed (or close) state, the angle or distance between the mounting part 210 and the film part 220 may vary. For example, the open state may refer to an opened state, an unfolding state, or an unfolded state.

The open state of the mounting device 200 is a state in which the mounting part 210 and the film part 220 are disposed at a certain angle, and may refer to a state where the mount device does not completely overlap. The open state of the mounting device 200 may refer to a state of any angle (or 5 to 180 degrees) that the angle between the mounting part 210 and the film part 220 is not 0 degrees. FIG. 2B shows a set of six views, e.g., a front view, a rear view, a left view, a right view, a top view, and a bottom view in the open state of the mounting device.

Figure 3:
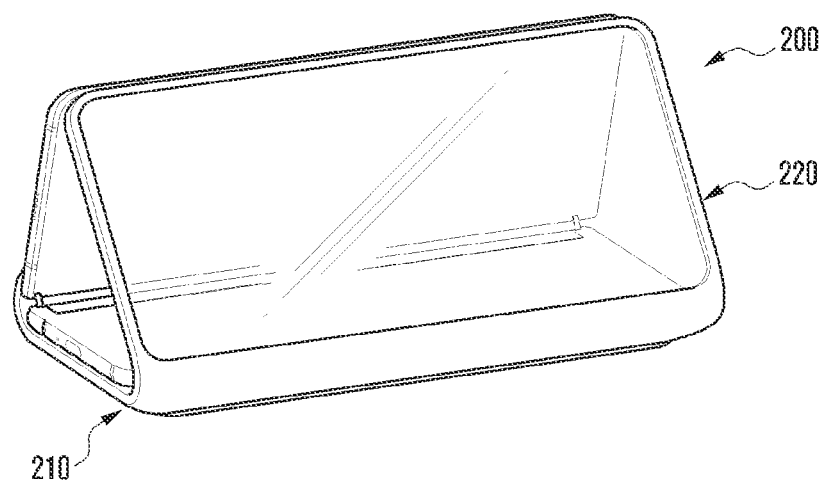
FIG. 3 is an exemplary diagram illustrating a state in which an external electronic device is mounted on a mounting device according to various example embodiments.

FIG. 3 is an exemplary diagram illustrating a state in which an external electronic device is mounted on a mounting device according to various embodiments. Each embodiment herein may be used in combination with any other embodiment herein.

According to various embodiments, the mounting device 200 may be designed in any scheme as long as the external electronic device (or electronic device) (e.g., the electronic device 101 in FIG. 1) having an in-folding form, an out-folding form, and/or a form in which two or more displays are overlapped can be mounted on the mount device. With reference to FIG. 3, the mounting device 200 may allow the external electronic device to be mounted in such a way that a partial region of the external electronic device in the folding state is placed on the mounting part 210 and the other region of the external electronic device leans against the film part 220.

According to various embodiments, a processor (e.g., the processor 120 in FIG. 1), including processing circuitry, of the mounting device 200 may detect a mounting state of the external electronic device (or electronic device) that can be mounted on the mounting device 200. A method for the processor to detect the mounting state may be performed in at least one or more ways.

The processor of the mounting device 200 may detect, as the mounting state, a case where some regions of the external electronic device are coupled (directly or indirectly) to both a magnet (e.g., first magnet) included in the mount part of the mounting device and a magnet (e.g., second magnet) included in the film part. According to another embodiment, the processor of the mounting device 200 may identify the mounting state by checking the result of detecting the state of the mounting part through a weight sensor (e.g., a gravity sensor, a pressure sensor, etc.) that may be included in the mounting part. According to still another embodiment, when determining that the folding angle of the external electronic device (or electronic device) mounted on the mounting device is a predetermined folding angle, the processor of the mounting device 200 may detect the mounting state by identifying that it is mounted. Rather than determining the folding angle by itself, the processor of the mounting device may be configured to receive the result detected using a folding angle sensor, etc. by the mounted external electronic device through a communication module (e.g., short-range communication module) of the mounting device and thereby detect the state of the mounting device.

The processor (the processor 120 in FIG. 1) of the mounting device 200 may be configured so that a display screen of the folded display of the mounted external electronic device is projected onto the film part and outputted in the form of a hologram. According to an embodiment, the processor of the mounting device 200 may allow, through the film part 220, the screen of the first side of the mounted external electronic device and the screen of the opposite second side with respect to the folding axis to be projected and outputted in the form of a hologram. For example, when the screen of the first side becomes a main display in the form of a hologram, the screen of the second side may become a background display in the form of a hologram. However, the output screen in the form of a hologram is not necessarily displayed only in an exemplary scheme, and the disclosure is not limited thereto.

Figure 4A:
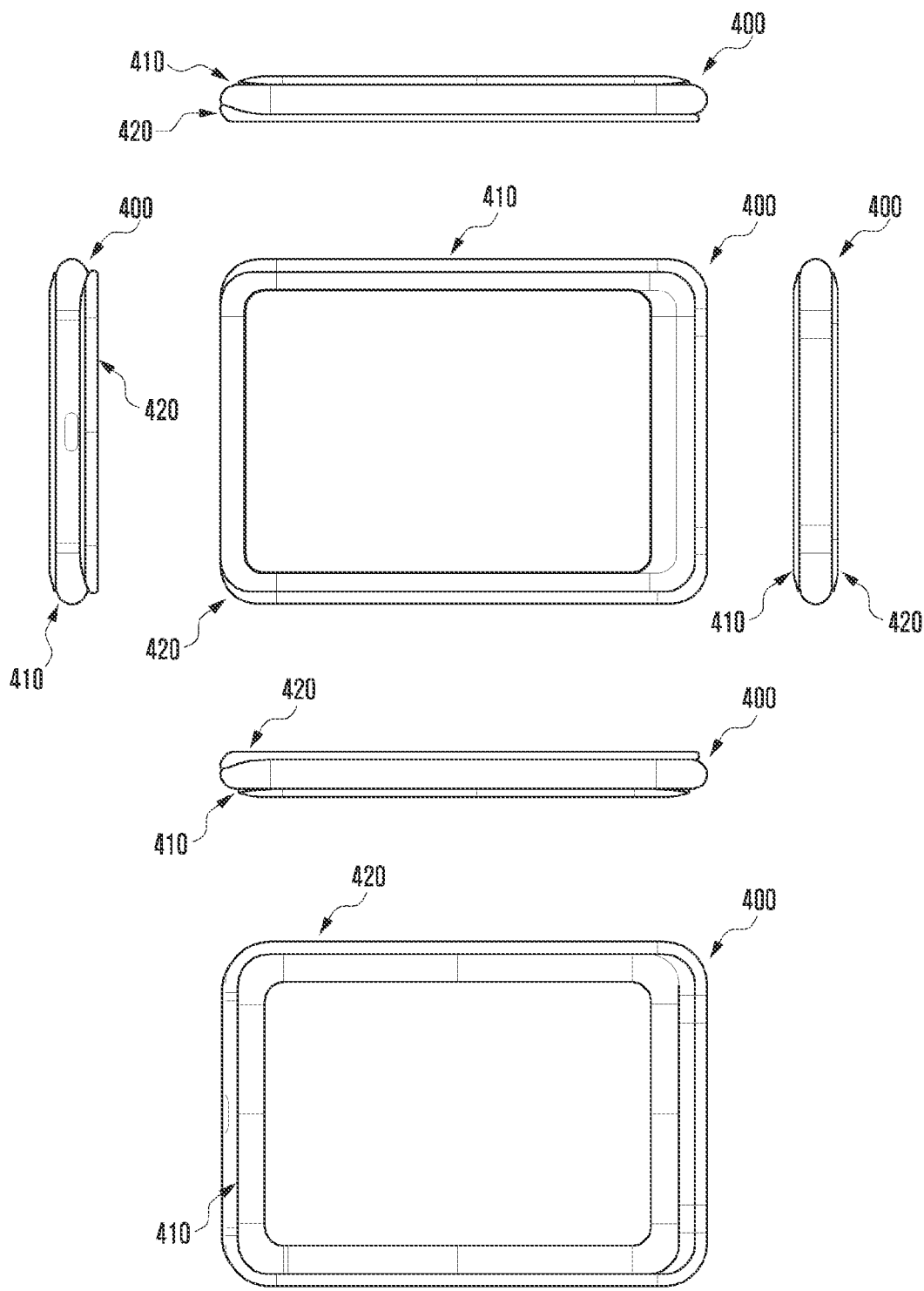
FIG. 4A shows a set of six views of a mounting device in a folding state according to various example embodiments.

FIG. 4A shows a set of six views of a mounting device in a folding state according to various embodiments.

With reference to FIG. 4A, a mounting device 400 (e.g., the mounting device 200 in FIG. 2A or 2B) according to various embodiments may include a mounting part 410 and a film part 420 and may include, at least in part, the structure and/or function of the electronic device 101 of FIG. 1 and/or the structure and/or function of the mounting device 200 in FIG. 2A or 2B. The mounting device may be designed such that the mounting part 410 and the film part 420 are connected by a hinge structure and thereby the mounting device is foldable.

According to various embodiments, the mounting part 410 (e.g., the mount part 210 in FIG. 2A or 2B) may have any shape as long as it has a structure of allowing an external electronic device to be placed and mounted. With reference to FIG. 4A, the mount part may allow a portion or all of the external electronic device to be placed, and may also include a wireless charging module. In case that the wireless charging module is included in the mounting part to provide wireless charging to the mounted external electronic device, any scheme capable of wirelessly charging the external electronic device, such as a magnetic induction scheme or a magnetic resonance scheme, may be available.

With reference to FIG. 4A, the film part 420 (e.g., the film part 220 in FIG. 2A or 2B) may allow hologram contents of the external electronic device mounted on the mounting device to be projected and displayed in the form of a hologram. According to an embodiment, the film part may be coupled (directly or indirectly) or attached to a partial region of a housing of the external electronic device or a partial region of the external electronic device.

With reference to FIG. 4A, in the folding state, the external electronic device may be placed on the film part. For example, in case that the mounting part includes a wireless charging module, if the mounting device is folded, the external electronic device may be mounted or placed on the film part in a state where the mount part and the film part are overlapped.

With reference to FIG. 4A, depending on whether the state of the mounting device 400 is an opened (or open) state or a closed (or close) state, the angle or distance between the mount part 410 and the film part 420 may vary. For example, the closed state may refer to a close state, a folding state, or a folded state.

The closed state of the mount device 400 is a state in which the mounting part 410 and the film part 420 are disposed to overlap with each other, and may refer to a state where the mounting device is completely folded. In the closed state of the mounting device, the angle between the mounting part and the film part forms a narrow angle (e.g., 0 to 5 degrees), and the mount part and the film part may face each other. FIG. 4A shows a set of six views, e.g., a front view, a rear view, a left view, a right view, a top view, and a bottom view in the closed state of the mounting device.

Hereinafter, an example that the external electronic device or electronic device mounted on the mounting device is implemented in an in-folding scheme will be described, but the following may be equally or similarly applied to the electronic device implemented in an out-folding scheme. In addition, the external electronic device or electronic device mounted on the mounting device may have a structure having a housing arranged left and right with respect to a folding axis and/or a structure having a housing arranged up and down with respect to a folding axis, and the folding axis may be two or more.

Also, although not shown in FIG. 4A, the mounting device 400 may include a magnet inside a partial region of the mounting part 410 and/or the film part 420.

FIG. 4B shows a set of six views of a mounting device in an unfolding state according to various embodiments.

With reference to FIGS. 4A and 4B, the mounting device 400 according to various embodiments may exist in the unfolding state with the film part 420 fixed, and the mounting part 410 and the film part 420 may be connected to each other in a hinge structure.

With reference to FIG. 4B, depending on whether the state of the mounting device 400 is an opened (or open) state or a closed (or close) state, the angle or distance between the mounting part 410 and the film part 420 may vary. For example, the open state may refer to an opened state, an unfolding state, or an unfolded state.

The open state of the mounting device 400 is a state in which the mounting part 410 and the film part 420 are disposed at a certain angle, and may refer to a state where the mounting device does not completely overlap. The open state of the mounting device 400 may refer to a state of any angle (or 5 to 180 degrees) that the angle between the mount part 410 and the film part 420 is not 0 degrees. FIG. 4B shows a set of six views, e.g., a front view, a rear view, a left view, a right view, a top view, and a bottom view in the open state of the mount device.

Figure 5:
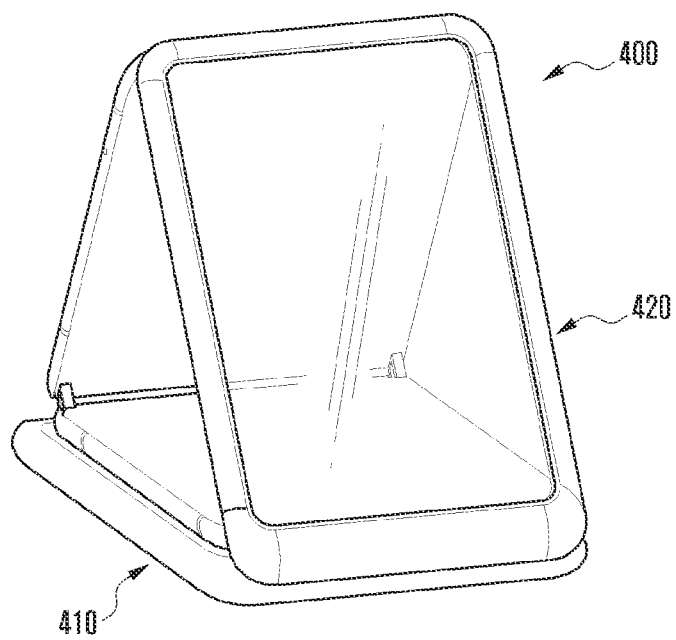
FIG. 5 is an exemplary diagram illustrating a state in which an external electronic device is mounted on a mounting device according to various example embodiments.

FIG. 5 is an exemplary diagram illustrating a state in which an external electronic device is mounted on a mounting device according to various embodiments.

According to various embodiments, the mounting device 400 (e.g., the mount device 200 in FIG. 2A or 2B) may be designed in any scheme as long as the external electronic device (or electronic device) (e.g., the electronic device 101 in FIG. 1) having an in-folding form, an out-folding form, or a form in which two or more displays are overlapped can be mounted on the mounting device. With reference to FIG. 5, the mounting device 400 may allow the external electronic device to be mounted in such a way that a partial region of the external electronic device in the folding state is placed on the mounting part 410 and the other region of the external electronic device leans against the film part 420.

According to various embodiments, a processor (e.g., the processor 120 in FIG. 1) of the mounting device 400 may detect a mounting state of the external electronic device (or electronic device) that can be mounted on the mounting device 400. A method for the processor to detect the mounting state may be performed in at least one or more ways.

The processor of the mounting device 400 may detect, as the mounting state, a case where some regions of the external electronic device are coupled to both a magnet (e.g., first magnet) included in the mount part of the mounting device and a magnet (e.g., second magnet) included in the film part. According to another embodiment, the processor of the mounting device 400 may identify the mounting state by checking the result of detecting the state of the mount part through a weight sensor (e.g., a gravity sensor, a pressure sensor, etc.) that may be included in the mounting part. According to still another embodiment, when determining that the folding angle of the external electronic device (or electronic device) mounted on the mounting device is a predetermined folding angle, the processor of the mounting device 400 may detect the mounting state by identifying that it is mounted. Rather than determining the folding angle by itself, the processor of the mounting device may be configured to receive the result detected using a folding angle sensor, etc. by the mounted external electronic device through a communication module (e.g., short-range communication module) of the mounting device and thereby detect the state of the mounting device.

The processor of the mounting device 400 may be configured so that a display screen of the folded display of the mounted external electronic device is projected onto the film part and outputted in the form of a hologram. According to an embodiment, the processor of the mounting device 400 may allow, through the film part 420, the screen of the first side of the mounted external electronic device and the screen of the opposite second side with respect to the folding axis to be projected and outputted in the form of a hologram. For example, when the screen of the first side becomes a main display in the form of a hologram, the screen of the second side may become a background display in the form of a hologram. However, the output screen in the form of a hologram is not necessarily displayed only in an exemplary scheme, and the disclosure is not limited thereto.

Figure 6:
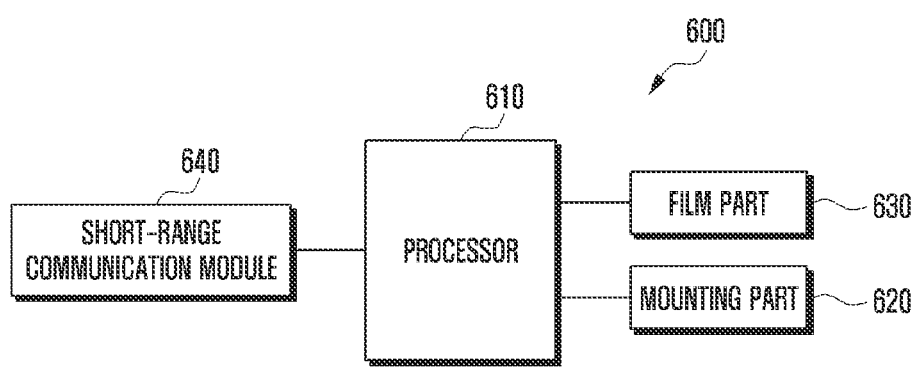
FIG. 6 is a block diagram illustrating a structure of a mounting device according to various example embodiments.

FIG. 6 is a block diagram illustrating a structure of a mounting device according to various embodiments.

According to various embodiments, a mounting device 600 (e.g., the electronic device 101 in FIG. 1, the mounting device 200 in FIG. 2A or 2B, the mounting device 400 in FIG. 4A or 4B) may include a processor 610 (e.g., the processor 120 in FIG. 1, the processor in FIG. 2A or 2B, the processor in FIG. 4A or 4B), a mounting part 620 (e.g., the mounting part 210 in FIG. 2A or 2B, or the mounting part 410 in FIG. 4A or 4B), a film part 630 (e.g., the film part 220 in FIG. 2A or 2B, or the film part 420 in FIG. 4A or 4B), and a short-range communication module 640 (e.g., the communication module 190 in FIG. 1) comprising communication circuitry and/or at least one antenna, and some of the illustrated components may be omitted or substituted. The mount device may include at least a part of the components and/or functions of the electronic device 101 in FIG. 1, the mounting device 200 in FIG. 2A or 2B, and/or the mounting device 400 in FIG. 4A or 4B. For example, the processor 610 of the mounting device may be the processor of the electronic device. Each "processor" herein includes processing circuitry.

According to various embodiments, the processor 610 is a component capable of performing an operation or data processing related to control and/or communication of respective components of the mounting device, and may include at least a part of the configuration and/or function of the processor 120 in FIG. 1. The processor may be functionally, operatively, and/or electrically connected to internal components of the mounting device that includes the mounting part 620, the film part 630, and the short-range communication module 640.

According to various embodiments, the processor 610 may detect a mounting state of an external electronic device (or electronic device) (e.g., the electronic device 101 in FIG. 1) that can be mounted on the mounting device. The processor of the mounting device may detect whether the external electronic device is mounted in a state of supporting or not supporting a hologram mode in the unfolding state, or is mounted in a state of not supporting the hologram mode in the folding state.

A method for the processor to detect the mounting state may be made in at least one or more schemes. For example, the processor of the mounting device may detect, as the mounting state, a case where some regions of the external electronic device are attached to both a magnet (e.g., first magnet) included in the mounting part of the mount device and a magnet (e.g., second magnet) included in the film part. The processor may be configured to identify the result of detecting the attachment of the magnet of the mounting device and the external electronic device through a sensor (magnetic sensor, etc.) included in the mounting device. The processor may detect a state, in which the magnets (e.g., the first magnet and the second magnet) of the mounting device are attached to the external electronic device, as the mounting state in which the external electronic device is unfolded and supports the hologram mode. According to another embodiment, the processor may identify no attachment of the magnets and the external electronic device and thereby detect it as the mounting state in which the external electronic device is unfolded and does not support the hologram mode or is folded and does not support the hologram mode.

According to another embodiment, the processor 610 of the mounting device may identify the mounting state by checking the result of detecting the state of the mounting part through a weight sensor (e.g., a gravity sensor, a pressure sensor, etc.) that may be included in the mounting part. For example, in case that the weight sensor is included in the mounting part, the horizontal mount part may be inclined at a certain angle when the external electronic device is placed on the mounting part. The processor may identify a state in which the external electronic device is placed on the mounting part, by checking the result of the weight sensor detecting the state of the inclined mounting part. In this embodiment, the processor may identify the state of the external electronic device placed on the mount part through the weight sensor and simultaneously check the attachment to the magnet or the folding angle, thereby detecting whether the external electronic device is unfolded and supports the hologram mode.

According to still another embodiment, when determining that the folding angle of the external electronic device (or electronic device) mounted on the mounting device is a predetermined folding angle, the processor 610 of the mounting device may detect the mounting state by identifying that it is mounted. In case that the folding angle of the external electronic device that can be mounted on the mounting device is 50 to 70 degrees, the processor of the mounting device may detect the mounting state as that the external electronic device is unfolded and mounted in a state of supporting the hologram mode. In another case that the folding angle of the external electronic device is other than 50 to 70 degrees, the processor may detect the mounting state as that the external electronic device is unfolded or folded and mounted in a state of not supporting the hologram mode. Rather than determining the folding angle by itself, the processor of the mounting device may be configured to receive the result detected using a folding angle sensor, etc. by the mounted external electronic device through a communication module comprising communication circuitry and/or at least one antenna (e.g., the module may be a short-range communication module) of the mounting device and thereby detect the state of the mounting device. The predetermined folding angle indicating the mounting state of the external electronic device (e.g., the folding angle when the external electronic device is mounted) is merely an example and may be changed by the user.

According to various embodiments, the processor 610 may check support information whether the external electronic device (or electronic device) that can be mounted on the mounting device supports the hologram mode, and this check may be performed in at least one scheme. In a manner similar to and/or the same as detecting the mounting state of the external electronic device, the processor of the mounting device may detect the mounting state by sensing that the external electronic device is coupled to the magnet of the mounting device, and at the same time may identify that the mounted external electronic device is a device supporting the hologram mode. In this case, only the external electronic device coupled to both the first magnet included in the part of the mounting device and the second magnet included in the film part may be previously designated as the device supporting the hologram mode. The processor may be configured to identify the result of detecting the coupling between the magnet of the mount device and the external electronic device through a sensor included in the mounting device.

According to another embodiment, if the mounted external electronic device reads and authenticates the authentication chip (e.g., hologram mode support authentication chip) included in the mounting device using the communication module included therein and then transmits the support information (e.g., information on hologram mode supportability) to the mounting device, the processor 610 of the mounting device may check the support information.

According to another embodiment, the processor 610 of the mounting device may be configured to transmit a UI, related to whether the hologram mode is supported, to the external electronic device (or electronic device) that can be mounted on the mounting device. For example, after the external electronic device is mounted on the mounting device and the mounting state is detected, the processor of the mounting device may transmit the UI, related to whether the hologram mode is supported, to the display (e.g., sub-display) of the mounted external electronic device using the short-range communication module or the like. Here, the UI related to whether the hologram mode is supported may be, for example, to allow selecting whether to execute the hologram mode, or to allow directly executing the hologram mode, on the display of the mounted external electronic device.

According to various embodiments, the processor 610 may transmit a transmission signal to the external electronic device mounted on the mounting device to project hologram contents onto the film part. In case of determining that the mounted external electronic device supports the hologram mode, the processor of the mounting device may transmit a hologram contents transmission signal to the external electronic device. The external electronic device that receives the transmission signal may project the hologram contents to the film part of the mounting device through different first and second sides, based on the folding axis, of the display facing the mounting device.

The processor 610 of the mount device may transmit a user input through a touch sensor of the film part to the external electronic device connected using a short-range communication module. The user's touch input through the film part of the mounting device may be used as an input for controlling the hologram contents projected on the film part of the mounting device from the mounted external electronic device.

The processor 610 of the mount device may transmit a user input through a button of the film part to the external electronic device connected using a short-range communication module. The user's touch input through the button of the mounting device may be used as an input for controlling the hologram contents projected on the film part of the mount device from the mounted external electronic device.

According to various embodiments, the external electronic device (or electronic device) that can be mounted on the mounting device may be placed on the mount part 620. The mounting part may have any shape as long as it allows the external electronic device (or electronic device) to be mounted, and its material may also not be limited. A partial or entire region of the external electronic device may be placed on the mounting part.

The mount part 620 may include a wireless charging module. According to various embodiments, the mounting part 620 may have any shape as long as it has a structure of allowing the external electronic device to be placed and mounted. In case that the external electronic device performs wireless charging, the processor of the mounting device may check whether the external electronic device is placed on the mount part. In case that the wireless charging module is included in the mounting part to provide wireless charging to the mounted external electronic device, any scheme capable of wirelessly charging the external electronic device, such as a magnetic induction scheme or a magnetic resonance scheme, may be available.

The mount part 620 may include a magnet in its partial region. The magnet included in the mounting part may be coupled to a partial region of the external electronic device mounted on the mounting device, and the processor of the mounting device may detect the coupling and thereby identify that the external electronic device is mounted on the mounting device.

The mounting part 620 may include a weight sensor. A sensor referred to as the weight sensor may be a gravity sensor, a pressure sensor, or the like, and may detect a state in which the external electronic device that can be mounted on the mounting part is mounted. For example, in case that the weight sensor is included in the mounting part, the horizontal mounting part may be inclined at a certain angle when the external electronic device is placed on the mounting part. The processor may identify a state in which the external electronic device is placed on the mounting part, by checking the result of the weight sensor detecting the state of the inclined mounting part.

The mounting part 620 may include the short-range communication module 640. The short-range communication module according to various embodiments may use any scheme capable of communication connection with the external electronic device that may be mounted on the mount device.

The mounting part 620 may include an authentication chip in its partial region. The authentication chip may be provided to identify hologram mode support information of the external electronic device that can be mounted on the mounting device. For example, if the mounted external electronic device reads and authenticates the authentication chip (e.g., hologram mode support authentication chip) included in the mounting device using the communication module included therein and then transmits the support information (e.g., information on hologram mode supportability) to the mounting device, the processor of the mounting device may check the support information.

According to various embodiments, the film part 630 may allow the hologram contents, outputted from the display of the external electronic device (or electronic device) mounted on the mount device, to be displayed in the form of a hologram.

The film part 630 may be formed of a material and/or structure that allows displaying in a hologram form (e.g., a floating hologram) when a laser or light is projected. For example, the film part of the mounting device may be made of a translucent material, and any material may be possible as long as the screen transmitted from the display of the mounted external electronic device is projected and outputted in the form of a hologram.

The processor 610 of the mounting device may allow, through the film part 630, the screen of the first side of the mounted external electronic device and the screen of the opposite second side with respect to the folding axis to be projected and outputted in the form of a hologram. For example, when the screen of the first side becomes a main display in the form of a hologram, the screen of the second side may become a background display in the form of a hologram.

According to various embodiments, the film part 630 may include a magnet in its partial region. The magnet included in the film part may be coupled to a partial region of the external electronic device mounted on the mounting device, and the processor of the mounting device may detect the coupling and thereby identify that the external electronic device is mounted on the mounting device. In addition, when the magnet of the mount part and the magnet of the film part are coupled to the mounted external electronic device, the processor of the mounting device may check the mounting state of the external electronic device and/or check hologram mode support information of the external electronic device.

According to various embodiments, the film part 630 may include a touch sensor. The film part of the mounting device including the touch sensor may be electrically connected to the processor of the mounting device. The touch sensor may detect a user's touch input on the film part of the mounting device and provide it to the processor.

According to various embodiments, the film part 630 may include one or more buttons and may be electrically connected to the processor of the mounting device. A piezoelectric sensor or the like that may be included in the film part may detect a user's input of pressing the button and provide it to the processor.

According to various embodiments, the short-range communication module 640 may be any type capable of communication connection with the external electronic device that may be mounted on the mounting device. For example, it may be a communication module capable of Bluetooth, Zigbee, near field communication (NFC), or the like. The short-range communication module may include at least a part of the configuration and/or function of the communication module 190 in FIG. 1.

Figure 7:
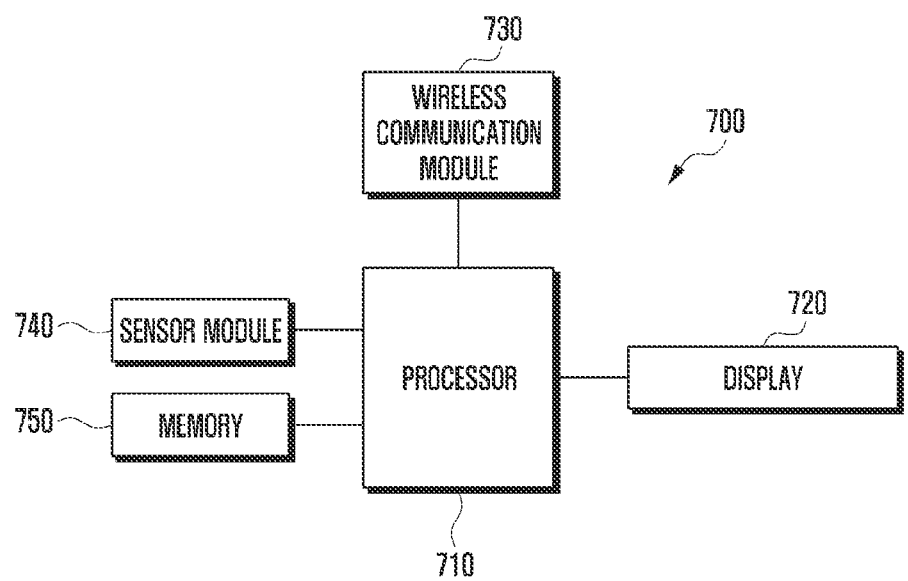
FIG. 7 is a block diagram illustrating a structure of an external electronic device according to various example embodiments.

FIG. 7 is a block diagram illustrating a structure of an external electronic device 700 (or electronic device) (e.g., the electronic device 101 in FIG. 1) according to various embodiments. In this document, in order to facilitate the description of a mounting device (e.g., the electronic device 101 in FIG. 1, the mounting device 200 in FIG. 2A or FIG. 2B, the mounting device 400 in FIG. 4A or FIG. 4B, the mounting device 600 in FIG. 6) on which the electronic device can be mounted, the mounted electronic device is referred to as an external electronic device, but this is only for convenience of understanding, and the external electronic device or electronic device may indicate any device that can be mounted. Also, it may refer to any electronic device that is mounted on the mounting device and can execute a hologram mode together with the mounting device.

According to various embodiments, the external electronic device 700 (e.g., the electronic device 101 in FIG. 1) may include a processor 710 (e.g., the processor 120 in FIG. 1, the processor in FIG. 2A or FIG. 2B, the processor in FIG. 4A or FIG. 4B), a display 720 (e.g., the display device 160 in FIG. 1), a wireless communication module 730 (e.g., the communication module 190 in FIG. 1), a sensor module 740 (e.g., the sensor module 176 in FIG. 1), and a memory 750 (e.g., the memory 130 in FIG. 1), and some of the illustrated components may be omitted or substituted. The external electronic device may include at least a part of the components and/or functions of the electronic device 101 in FIG. 1.

According to various embodiments, the processor 710 is a component capable of performing an operation or data processing related to control and/or communication of respective components of the external electronic device, and may include at least a part of the configuration and/or function of the processor 120 in FIG. 1. The processor may be functionally, operatively, and/or electrically connected to internal components of the external electronic device that includes the display, the wireless communication module, the sensor module, and the memory.

The display 720 of the external electronic device may be at least one or more. For example, in case that the external electronic device is a foldable electronic device, it may include the display on the front and/or rear surfaces. According to another embodiment, the external electronic device may have a structure in which two or more displays are arranged side by side. The structure in which two or more displays of the external electronic device are arranged side by side may have a foldable scheme.

A portion of the display of the external electronic device may be in a state of facing the film part of the mount device when the external electronic device is mounted on the mount device. For example, when the external electronic device of in-folding type is folded and mounted on the mount device, the display of the external electronic device may be folded based on the folding axis to face the film part of the mount device. In the folded display of the external electronic device, two regions facing the mount device may be referred to as a first region and a second region, and these individual display regions may project hologram contents onto the film part of the mounting device.

Among the displays of the external electronic device, when a display that is folded to face the mount device is referred to as a main display, a display that is not facing the mounting device may be referred to as a sub-display. The display of the external electronic device may include at least a part of the structure and/or function of the display device 160 in FIG. 1.

The wireless communication module 730 of the external electronic device may receive a signal (e.g., a hologram mode support information check signal of the external electronic device, a hologram contents transmission signal, a hologram contents control signal, etc.) from the short-range communication module of the mount device, and also transmit a signal (e.g., a hologram mode support information signal, a hologram contents control signal, etc.) to the mounting device. The wireless communication module may include at least a part of the structure and/or function of the communication module 190 in FIG. 1.

According to various embodiments, the sensor module 740 may include at least a part of the structure and/or function of the sensor module 176 in FIG. 1. According to various embodiments, the memory 750 may include at least a part of the structure and/or function of the memory 130 in FIG. 1.

FIG. 8 is a flowchart for executing a hologram mode of a mounting device (e.g., the electronic device 101 in FIG. 1, the mounting device 200 in FIG. 2A or FIG. 2B, the mounting device 400 in FIG. 4A or FIG. 4B, the mounting device 600 in FIG. 6) according to various embodiments. In the following embodiment, respective operations may be, but not necessarily, sequentially performed. For example, the order of respective operations may be changed, and at least two operations may be performed in parallel.

With reference to FIG. 8, a processor (e.g., the processor 120 in FIG. 1, the processor in FIG. 2A or FIG. 2B, the processor in FIG. 4A or FIG. 4B, the processor 610 in FIG. 6) of the mount device may detect at operation 810 a state in which an external electronic device (or electronic device) (e.g., the electronic device 101 in FIG. 1) is mounted on the mounting device.

The processor may detect various states in which the external electronic device (or electronic device) is mounted on the mount device. The processor of the mounting device may detect a mounting state in which the external electronic device is in an unfolding state (opened state, open state) and supports a hologram mode. With reference to FIGS. 2A to 5, the processor of the mounting device may identify the result of detecting the mounting state in which the external electronic device being in the unfolding state is mounted on the mounting device and supports the hologram mode. For example, the processor of the mounting device may identify the result of sensing that the folding angle of the external electronic device is a predetermined folding angle, identify the result of sensing whether magnets (e.g., first magnet and second magnet) of the mount device are attached, or identify the result of using both of the above methods. The processor of the mounting device may determine the mounting state of the external electronic device through the above identified result and, in particular, may determine whether the external electronic device is mounted in a state of supporting the hologram mode.

According to another embodiment, the processor of the mounting device may detect the mounting state in which the external electronic device (or electronic device) is in the folding state (closed state, close state) or in the unfolding state and is mounted in a state of not supporting the hologram mode. The processor may identify the result of sensing that the folding angle of the external electronic device does not correspond to the predetermined folding angle, identify the result of sensing whether the magnets of the mount device are attached, or identify the result of using both of the above methods. The processor of the mounting device may determine the mounting state of the external electronic device on the mounting device through the above identified result and, in particular, may determine whether the external electronic device is mounted in a state of supporting the hologram mode. According to still another embodiment, in case that the external electronic device is mounted in the folding state or the unfolding state, the processor of the mounting device may determine whether the external electronic device is a device supporting the hologram mode. For example, upon determining whether the mounted external electronic device is a device supporting the hologram mode, the processor of the mounting device may identify the presence or absence of an authentication chip (e.g., a hologram mode support authentication chip) that may be included in the external electronic device. In identifying the presence or absence of the authentication chip of the external electronic device, the processor of the mounting device may use a communication module (e.g., a short-range communication module), but a method of identifying the authentication chip is not limited thereto.

According to another embodiment, the processor of the mounting device may omit determining whether the external electronic device supports the hologram mode. For example, the processor of the mounting device may omit operations 820 and 830 by identifying the external electronic device that has been determined by performing operations 810 to 830. That is, as to the external electronic device for which it has been previously identified at the operation 830 whether the hologram mode is supported, the processor of the mounting device may be configured to proceed directly from the operation 810 to the operation 840 without performing the operations 820 and 830 again.

With reference to FIG. 8, at the operation 820, the processor of the mounting device may use the short-range communication module of the mounting device to receive support information indicating whether the external electronic device supports the hologram mode. The hologram mode may refer to a mode of displaying hologram contents, provided from the external electronic device, in the form of a hologram (e.g., a pseudo hologram). The hologram contents may be composed of, or include, a combination of applications that can be executed in the external electronic device, and may be updated or customized through a user, a device provider, an application providing platform, and/or the like.

With reference to FIG. 8, at the operation 830, the processor of the mounting device may perform determination by checking the hologram mode support information received from the external electronic device. At the operation 830, the processor of the mounting device may check the hologram mode support information of the mounted external electronic device through various schemes.

For example, if the mounted external electronic device reads and authenticates the authentication chip (e.g., hologram mode support authentication chip) included in the mounting device using the communication module included therein and then transmits the support information (e.g., information on hologram mode supportability) to the mounting device, the processor may check the support information.

According to another embodiment, in a manner similar to and/or the same as detecting the mounting state of the external electronic device at the operation 810, the processor may detect the mounting state by sensing that the external electronic device is coupled to the magnet of the mounting device, and at the same time may identify that the mounted external electronic device is a device supporting the hologram mode. In this case, only the external electronic device coupled to both the first magnet included in the part of the mounting device and the second magnet included in the film part may be previously designated as the device supporting the hologram mode. The processor may be configured to identify the result of detecting the coupling between the magnet of the mount device and the external electronic device through a sensor included in the mounting device.

With reference to FIG. 8, in case of determining that the mounted external electronic device supports the hologram mode, the processor of the mounting device may transmit a hologram contents transmission signal to the external electronic device at the operation 840. The external electronic device that receives the transmission signal may project the hologram contents to the film part of the mounting device through different first and second sides, based on the folding axis, of the display facing the mounting device.

Figure 9A:
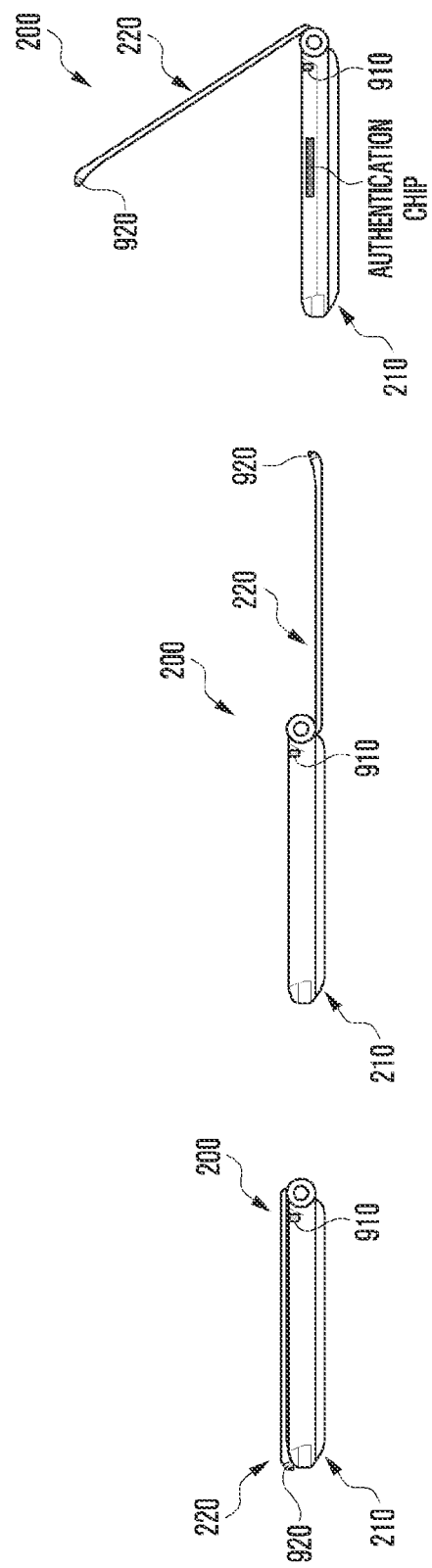
FIG. 9A is an exemplary diagram illustrating a magnet included in a mounting device according to various example embodiments.

FIG. 9A is an exemplary diagram illustrating magnets 910 and 920 included in a mounting device (e.g., the electronic device 101 in FIG. 1, the mounting device 200 in FIG. 2A or FIG. 2B, the mounting device 400 in FIG. 4A or FIG. 4B, the mounting device 600 in FIG. 6) according to various embodiments. With reference to FIG. 9A, although only a first magnet 910 and a second magnet 920 are illustrated, the number of magnets is not limited and more magnets may be included. In addition, the positions of the magnets included in the mounting part and/or the film part are not limited to the illustrated positions, and any position is possible as long as it can form a folding angle that allows the external electronic device to be stably mounted on the mounting device.

FIG. 9B is an exemplary diagram illustrating that for mounting a partial region of an external electronic device 930 is attached to a magnet included in a mounting device (e.g., the electronic device 101 in FIG. 1, the mounting device 200 in FIG. 2A or FIG. 2B, the mounting device 400 in FIG. 4A or FIG. 4B, the mounting device 600 in FIG. 6) according to various embodiments. With reference to FIG. 9B, although only the first magnet 910 and the second magnet 920 are illustrated, the number of magnets is not limited and more magnets may be included. In addition, the positions of the magnets included in the mounting part and/or the film part are not limited to the illustrated positions, and any position is possible as long as it can form a folding angle that allows the external electronic device to be stably mounted on the mounting device.

The magnets included in the mount device are coupled to a partial region of the external electronic device. With reference to FIG. 9B, based on the folding axis of the external electronic device, a display region included in a housing coupled to the magnet of the mount part of the mounting device is referred to as a second side, and a display region included in a housing coupled to the magnet of the film part is referred to as a first side.

Figure 10:
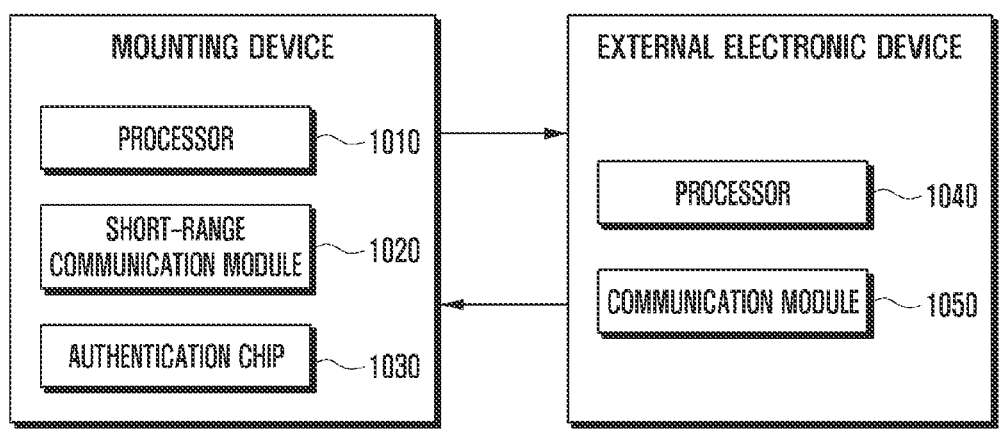
FIG. 10 is a block diagram illustrating a configuration for checking hologram mode support information of an external electronic device using an authentication chip included in a mounting device according to various example embodiments.

FIG. 10 is a block diagram illustrating a configuration for checking hologram mode support information of an external electronic device using an authentication chip 1030 included in a mounting device (e.g., the electronic device 101 in FIG. 1, the mount device 200 in FIG. 2A or FIG. 2B, the mounting device 400 in FIG. 4A or FIG. 4B, the mounting device 600 in FIG. 6) according to various embodiments.

A processor 1010 (e.g., the processor 120 in FIG. 1, the processor in FIG. 2A or FIG. 2B, the processor in FIG. 4A or FIG. 4B, the processor 610 in FIG. 6) of the mounting device may check support information indicating whether the external electronic device mounted on the mounting device supports the hologram mode, and this check may be performed in one or more schemes. For example, if the mounted external electronic device reads and authenticates the authentication chip 1030 (e.g., hologram mode support authentication chip) included in the mounting device using a communication module 1050 (e.g., the communication module 190 in FIG. 1, the wireless communication module 730 in FIG. 7) included therein and then transmits the support information (e.g., information on hologram mode supportability) to the mounting device, the processor may check the support information.

According to another embodiment, without using the authentication chip of the mounting device, it is possible to determine the coupling between the magnets (e.g., the first magnet 910 and the second magnet 920 in FIG. 9B) included in the mounting device and the mounted external electronic device. With reference to FIG. 8, in a manner similar to and/or the same as detecting the mounting state of the external electronic device at the operation 810, the processor may detect the mounting state by sensing that the external electronic device is coupled to the magnet of the mounting device, and at the same time may identify that the mounted external electronic device is a device supporting the hologram mode. In this case, only the external electronic device coupled to both the first magnet included in the part of the mounting device and the second magnet included in the film part may be previously designated as the device supporting the hologram mode. The processor may be configured to identify the result of detecting the coupling between the magnet of the mounting device and the external electronic device through a sensor included in the mounting device.

FIG. 11A is an exemplary diagram illustrating hologram contents control through a touch sensor included in a film part of a mounting device according to various embodiments.

With reference to FIG. 11A, a film part 220 (e.g., the film part 420 in FIG. 4A or FIG. 4B, the film part 630 in FIG. 6) of a mounting device 200 (e.g., the electronic device 101 in FIG. 1, the mounting device 400 in FIG. 4A or FIG. 4B, the mounting device 600 in FIG. 6) may include a touch sensor. The touch sensor of the film part may be electrically connected to a processor (e.g., the processor 120 in FIG. 1, the processor in FIG. 2A or FIG. 2B, the processor in FIG. 4A or FIG. 4B, the processor 610 in FIG. 6) of the mounting device. The processor may be configured to identify a user's touch input sensed through the touch sensor 1110.

The processor of the mounting device may transmit a user input through the touch sensor of the film part to an external electronic device (or electronic device) (e.g., the external electronic device 700 in FIG. 7, the external electronic device 930 in FIG. 9B, the external electronic device in FIG. 10) connected using a short-range communication module (e.g., the short-range communication module 640 in FIG. 6). The user's touch input through the film part of the mounting device may be used as an input for controlling the hologram content projected on the film part of the mounting device from the mounted external electronic device.

According to various embodiments, the hologram contents that can be projected as a hologram through the mounting device 200 may include video call, message transmission/reception, AOD display, music playback, album view, or emoji-related contents. When the hologram mode is executed, hologram content executable in the hologram mode may be displayed on the film part of the mounting device and/or a sub-display 1120 of the mounted external electronic device. The hologram contents may be displayed in the form of a UI that a user can select and/or control.

According to an embodiment, in case that the external electronic device is mounted on the mounting device 200 in the unfolding state allowing the execution of the hologram mode and the hologram mode is executed, the film part 220 of the mounting device and the sub-display 1120 of the mounted external electronic device may display hologram content (applications) that are installed and executable in the external electronic device. Using the film part 220 of the mounting device or the sub-display 1120 of the mounted external electronic device, the user may select the hologram content to be executed and control the selected contents on both sides (the film part 220 of the mount device or the sub-display 1120 of the external electronic device). Because of being applications that can be executed in the external electronic device, the hologram contents may use the UI of the applications as it is or use a UI reconfigured by the content provider to be suitable for the execution in the hologram mode.

Figure 11B:
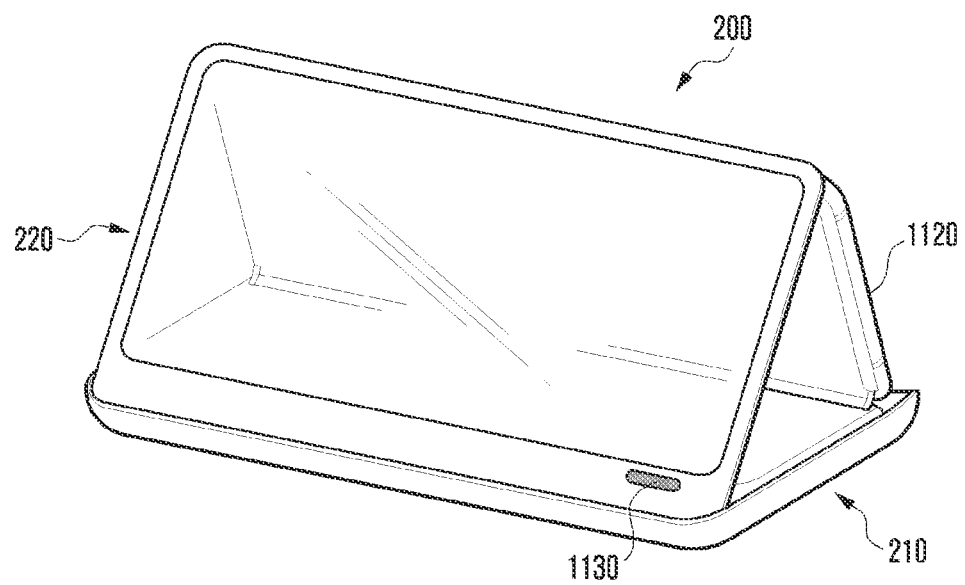
FIG. 11B is an exemplary diagram illustrating hologram contents control through a button included in a film part of a mounting device according to various example embodiments.

FIG. 11B is an exemplary diagram illustrating hologram contents control through a button included in a film part of a mount device according to various embodiments.

With reference to FIG. 11B, the film part 220 (e.g., the film part 420 in FIG. 4A or FIG. 4B, the film part 630 in FIG. 6) of the mounting device 200 (e.g., the electronic device 101 in FIG. 1, the mounting device 400 in FIG. 4A or FIG. 4B, the mounting device 600 in FIG. 6) may include one or more buttons 1130. The button of the film part may be electrically connected to the processor (e.g., the processor 120 in FIG. 1, the processor in FIG. 2A or FIG. 2B, the processor in FIG. 4A or FIG. 4B, the processor 610 in FIG. 6) of the mounting device. The processor may be configured to identify a user's input of the button 1130 sensed through a piezoelectric sensor or the like that may be included in the film part.

With reference to FIG. 11B, one button 1130 is illustrated, but this is not a limitation. For example, three or more buttons 1130 may be formed to control a music playback application among hologram contents. The three buttons 1130 may correspond to UI control for executing a previous song, play (or stop), or a next song, respectively. As such, the button 1130 of the mounting device may be composed of, or include, at least one or more, and may be configured to correspond to a function executed according to the selection of a UI for controlling hologram contents that are projected and executable through the mounting device.

The processor of the mounting device may transmit a user input through the button 1130 of the film part to an external electronic device (or electronic device) (e.g., the external electronic device 700 in FIG. 7, the external electronic device 930 in FIG. 9B, the external electronic device in FIG. 10) connected using a short-range communication module (e.g., the short-range communication module 640 in FIG. 6). The user's touch input through the button of the mount device may be used as an input for controlling the hologram contents projected on the film part of the mounting device from the mounted external electronic device.

According to various embodiments, the hologram contents that can be projected as a hologram through the mounting device 200 may include video call, message transmission/reception, AOD display, music playback, album view, or emoji-related content. When the hologram mode is executed, hologram content executable in the hologram mode may be displayed on the film part of the mounting device and/or the sub-display 1120 of the mounted external electronic device. The hologram content may be displayed in the form of a UI that a user can select and/or control.

According to an embodiment, in case that the external electronic device is mounted on the mounting device 200 in the unfolding state allowing the execution of the hologram mode and the hologram mode is executed, the film part 220 of the mounting device and the sub-display 1120 of the mounted external electronic device may display hologram content (applications) that are installed and executable in the external electronic device. Using the button 1130 of the film part of the mounting device or the sub-display 1120 of the mounted external electronic device, the user may select the hologram contents to be executed and control the selected contents on both sides (the film part 220 (especially, the button 1130) of the mounting device or the sub-display 1120 of the external electronic device). Because of being applications that can be executed in the external electronic device, the hologram contents may use the UI of the applications as it is or use a UI reconfigured by the content provider to be suitable for the execution in the hologram mode.

With reference to FIGS. 11A and 11B, the film part 220 of the mounting device may include the touch sensor 1110 and/or the at least one button 1130. The user may control the hologram contents through an input using the touch sensor of the film part of the mounting device, an input using the button, or an input using the sub-display of the external electronic device.

Figure 12:
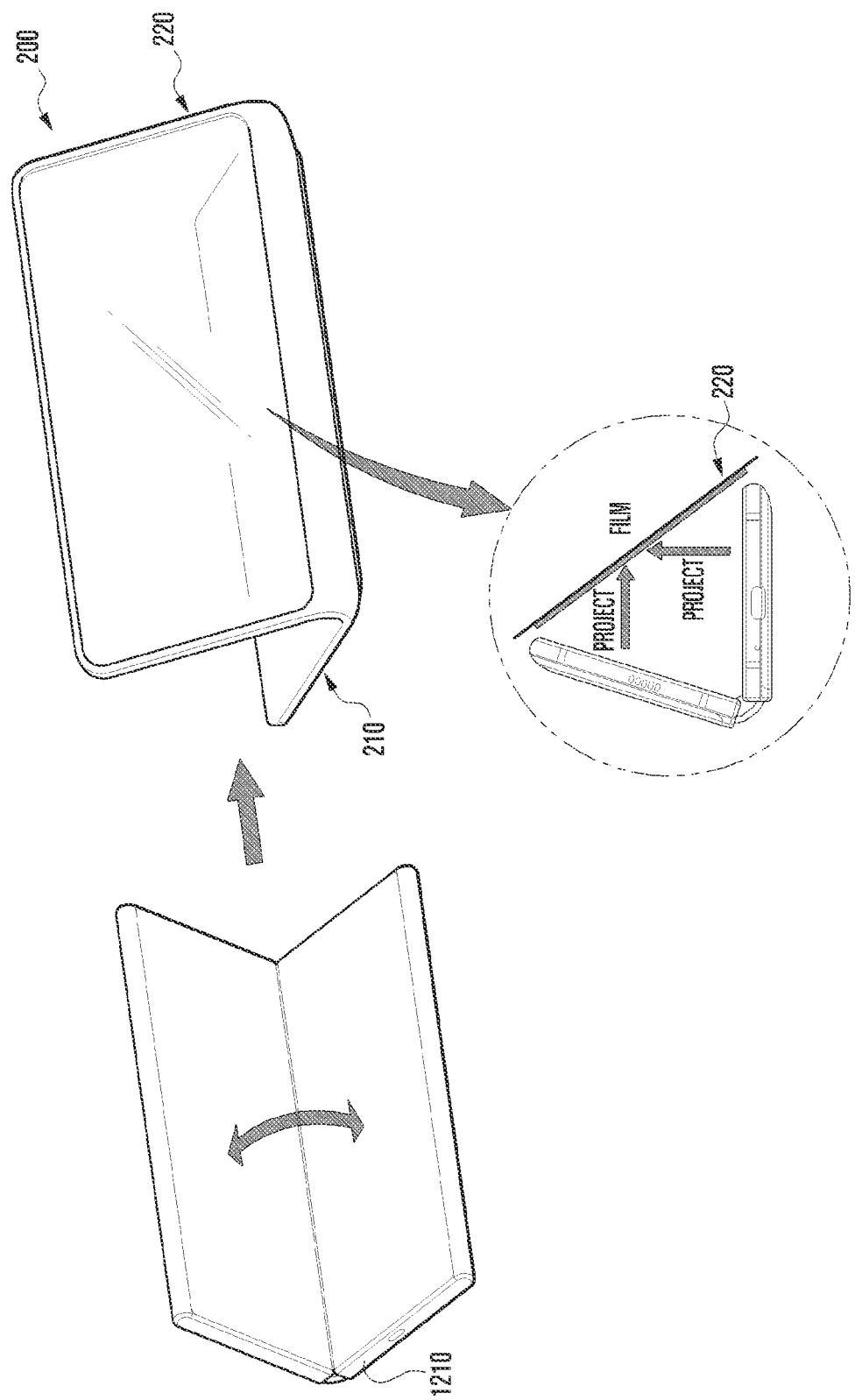
FIG. 12 is an exemplary diagram illustrating that hologram contents of an external electronic device are projected onto a film part of a mounting device according to various example embodiments.

FIG. 12 is an exemplary diagram illustrating that hologram contents of an external electronic device are projected onto a film part of a mounting device according to various embodiments.

According to various embodiments, the film part 220 (e.g., the film part 420 in FIG. 4A or FIG. 4B, the film part 630 in FIG. 6) of the mounting device 200 (e.g., the electronic device 101 in FIG. 1, the mounting device 400 in FIG. 4A or FIG. 4B, the mounting device 600 in FIG. 6) may have a structure capable of displaying an output in the form of a hologram. The output in the form of a hologram projected on the film part of the mounting device may be displayed as a pseudo hologram, which may be, for example, a floating hologram. According to an embodiment, the film part of the mounting device may be made of a translucent material, and any material may be possible as long as the screen transmitted from the display of the mounted external electronic device is projected and outputted in the form of a hologram.

The processor of the mounting device 200 may allow, through the film part 220, the screen of the first side of the mounted external electronic device 1210 (or electronic device) (e.g., the external electronic device 700 in FIG. 7, the external electronic device 930 in FIG. 9B, the external electronic device in FIG. 10, the external electronic device in FIG. 11A or FIG. 11B) and the screen of the opposite second side with respect to the folding axis to be projected and outputted in the form of a hologram. For example, when the screen of the first side becomes a main display in the form of a hologram, the screen of the second side may become a background display in the form of a hologram.

FIGS. 13A to 13D are exemplary diagrams of hologram content output upon execution of a hologram mode of a mounting device according to various embodiments.

The hologram mode may refer to a mode of displaying hologram content, provided from the external electronic device (or electronic device) (e.g., the external electronic device 700 in FIG. 7, the external electronic device 930 in FIG. 9B, the external electronic device in FIG. 10, the external electronic device in FIG. 11A or FIG. 11B), in the form of a hologram (e.g., a pseudo hologram). With reference to FIGS. 13A to 13D, the hologram content outputted through the film part of the mounting device may be composed of, or include, a combination of applications that can be executed in the external electronic device mounted on the mounting device, and may be updated or customized through a user, a device provider, an application providing platform, and/or the like.

Figure 13A:
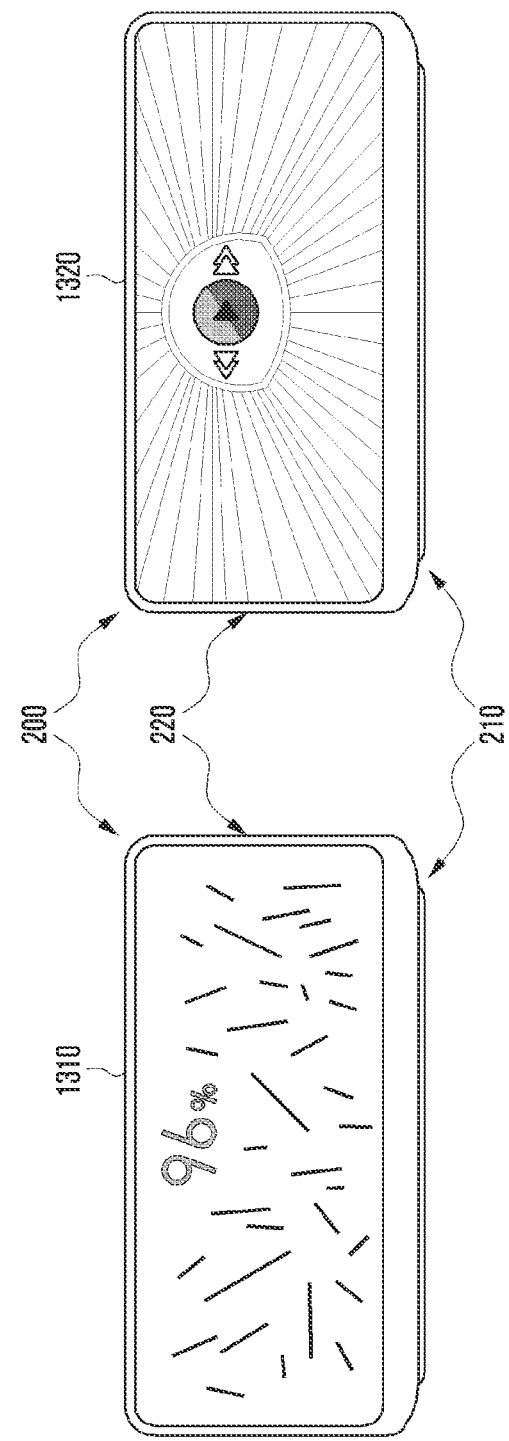
FIG. 13A is an exemplary diagram of hologram contents output upon execution of a hologram mode of a mounting device according to various example embodiments.

With reference to FIG. 13A, the hologram content projected and displayed on the film part 220 (e.g., the film part 420 in FIG. 4A or FIG. 4B, the film part 630 in FIG. 6) of the mounting device 200 (e.g., the electronic device 101 in FIG. 1, the mounting device 400 in FIG. 4A or FIG. 4B, the mounting device 600 in FIG. 6) may include an AOD display 1310. For example, the AOD may include a current time, a battery level, weather information, and/or information related to date. According to another embodiment, the hologram content may output various backgrounds in addition to the AOD display.

With reference to FIG. 13A, a display region (e.g., the second side) of the external electronic device placed on the mounting part 210 (e.g., the mounting part 410 in FIG. 4A or FIG. 4B, the mounting part 620 in FIG. 6) of the mounting device may project various backgrounds onto the film part of the mounting device, and a display region (e.g., the first side) of the external electronic device coupled to the film part of the mounting device may project the AOD display onto the film part of the mounting device. According to an embodiment, when the user makes a touch input (or clicks a button) through the film part (or the button) or the sub-display of the mounted external electronic device, the background of the AOD display may be changed to a snow-falling background by reflecting the current weather.

With reference to FIG. 13A, the hologram content that can be projected and displayed on the film part 220 of the mounting device 200 may include a music playback 1320. For example, a music playback application that is executable in the external electronic device may be executed and information on a song being played may be projected onto the film part of the mounting device. According to another embodiment, information on a currently played song of the music playback application and/or a UI (e.g., play, stop, pause, previous song, next song, etc.) required for music playback may also be displayed.

With reference to FIG. 13A, the display region (e.g., the second side) of the external electronic device placed on the mounting part of the mount device may project various backgrounds onto the film part of the mounting device, and the display region (e.g., the first side) of the external electronic device coupled to the film part of the mounting device may project contents related to music playback (e.g., information on a currently playing song, music application playback UI) onto the film part of the mounting device.

The UI for controlling the hologram content 1310 and 1320 shown in FIG. 13A may correspond to at least one button (e.g., the button 1130 in FIG. 11B) that may be included in the mounting device 200. For example, the button may be configured to perform a function according to selection of a UI for controlling hologram content. First, second, and third buttons may be configured to perform a function of selecting a previous song, a function of play or pause, and a function of selecting a next song, respectively.

Figure 13B:
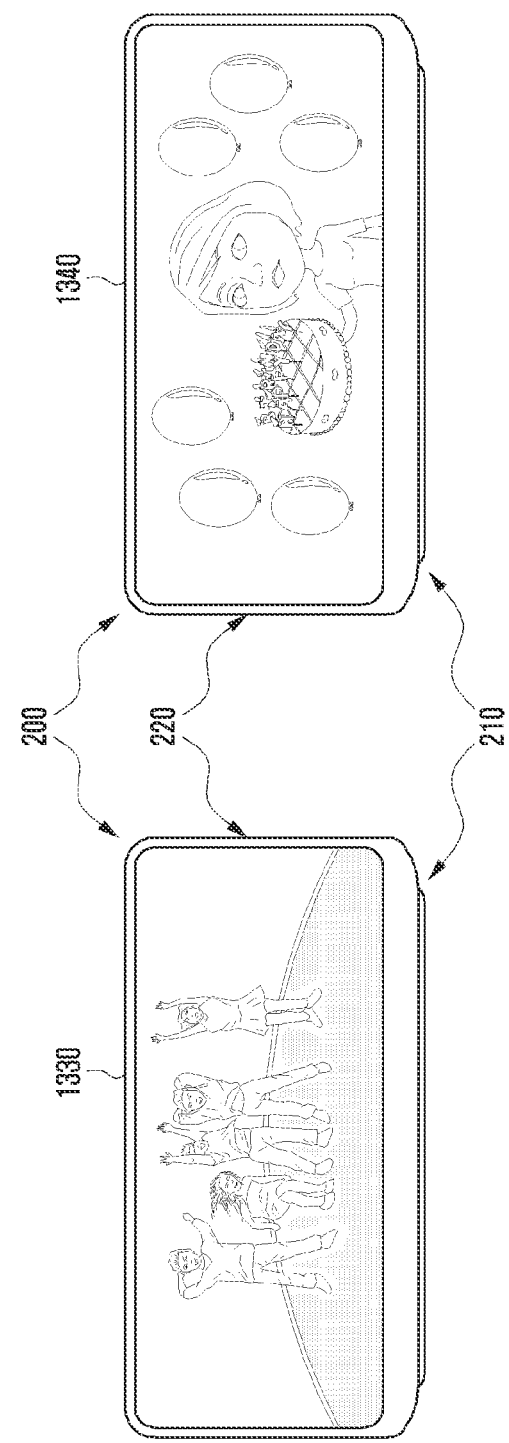
FIG. 13B is an exemplary diagram of hologram contents output upon execution of a hologram mode of a mounting device according to various example embodiments.

With reference to FIG. 13B, the hologram content that can be projected and displayed on the film part 220 of the mounting device 200 may include an album view 1330. For example, an album application (e.g., gallery) that is executable in the external electronic device may be executed, and photo and/or video may be projected onto the film part of the mounting device. According to another embodiment, a UI necessary for viewing and/or editing the album application may also be displayed.

With reference to FIG. 13B, the display region (e.g., the second side) of the external electronic device placed on the mounting part 210 of the mounting device 200 may project an image of background only extracted from the photo of the album application onto the film part of the mounting device, and the display region (e.g., the first side) of the external electronic device coupled to the film part of the mounting device may project an image of persons only extracted from the photo of the album application onto the film part of the mounting device. According to an embodiment, when the user makes a touch input (or clicks the button) through the film part (or the button) or the sub-display of the mounted external electronic device, the person or background being viewed in the album application may be changed. For example, such editing using the UI may be a scheme of scrolling left the film part to change a person or scrolling right the film part to change a background. The user's hologram contents control (viewing and/or editing control of the album application) is not limited to the above example.

With reference to FIG. 13B, the hologram contents that can be projected and displayed on the film part 220 of the mounting device 200 may include emoji-related contents 1340. For example, an emoji-related application that is executable in the external electronic device may be executed, and a stored emoji may be projected onto the film part of the mounting device. According to another embodiment, a currently selected emoji of the emoji-related application and/or a UI related to editing the selected emoji may also be displayed.

With reference to FIG. 13B, the display region (e.g., the second side) of the external electronic device placed on the mounting part 210 of the mounting device 200 may project various backgrounds (e.g., emoji-related backgrounds) onto the film part of the mounting device, and the display region (e.g., the first side) of the external electronic device coupled to the film part of the mounting device may project emoji-related contents onto the film part of the mounting device. According to an embodiment, when the user makes a touch input (or clicks the button) through the film part (or the button) or the sub-display of the mounted external electronic device, editing may be performed such as changing the pose, clothes, or expression of the currently selected emoji. The user's hologram contents control (controlling emoji and/or selected emoji editing) is not limited to the above example.

Figure 13C:
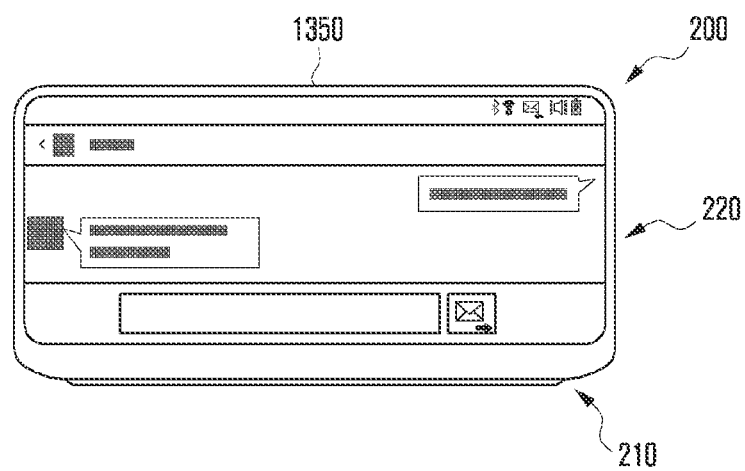
FIG. 13C is an exemplary diagram of hologram content output upon execution of a hologram mode of a mounting device according to various example embodiments.

With reference to FIG. 13C, the hologram content that can be projected and displayed on the film part 220 of the mounting device 200 may include message transmission/reception related contents 1350. For example, the message transmission/reception related content may include a message transmission/reception related application that is executable in the external electronic device (or electronic device) that may be mounted on the mounting device. According to another embodiment, the hologram content may output various backgrounds along with the message transmission/reception related content.

With reference to FIG. 13C, the display region (e.g., the second side) of the external electronic device placed on the mounting part 210 of the mounting device 200 may project various backgrounds onto the film part of the mounting device, and the display region (e.g., the first side) of the external electronic device coupled to the film part of the mounting device may project the message transmission/reception related contents onto the film part of the mount device.

Figure 13D:
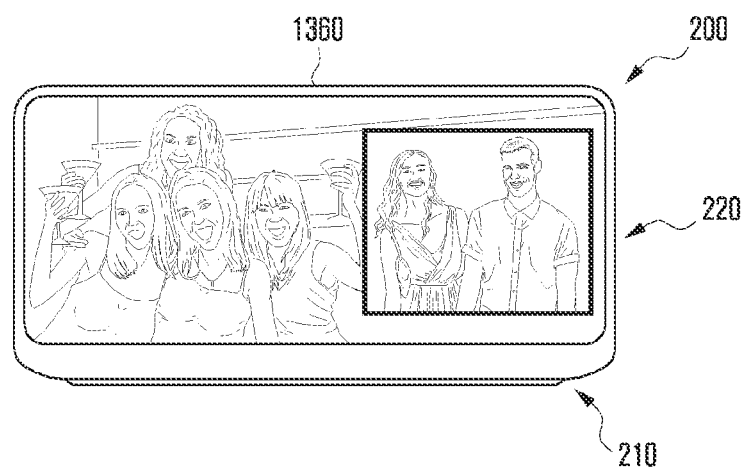
FIG. 13D is an exemplary diagram of hologram content output upon execution of a hologram mode of a mounting device according to various example embodiments.

With reference to FIG. 13D, the hologram content that can be projected and displayed on the film part 220 of the mounting device 200 may include video call related content 1360. For example, the video call related content may include a UI for a video call and/or information for a general call. For example, in order to connect a video call and/or a general call, a contact application of the external electronic device (or electronic device) may be accessed and displayed together.

According to another embodiment, the hologram content that can be projected and displayed on the film part 220 of the mounting device 200 may include a game application (not shown). For example, game application related content may include a UI for executing the game application and/or information on the game application being executed. In addition, the game application as the hologram content may include, but is not limited to, game applications for supporting the hologram mode other than the game application installed in the external electronic device (or electronic device).

FIG. 14 is an exemplary diagram illustrating charging of an electronic device through a wireless charging module included in a part of a mounting device according to various embodiments. Each "module" herein may comprise circuitry.

According to various embodiments, the mounting device 200 (e.g., the electronic device 101 in FIG. 1, the mounting device 400 in FIG. 4A or FIG. 4B, the mounting device 600 in FIG. 6) may include a wireless charging module in the mounting part 210 (e.g., the mounting part 410 in FIG. 4A or FIG. 4B, the mounting part 620 in FIG. 6). The wireless charging module that may be included in the mounting part may be any scheme as long as it is capable of providing wireless charging to the external electronic device 1410 or 1420 (or electronic devices) (e.g., the external electronic device 700 in FIG. 7, the external electronic device 930 in FIG. 9B, the external electronic device in FIG. 10, the external electronic device in FIG. 11A or FIG. 11B) that may be mounted on the mounting device. For example, it may be a scheme of using magnetic induction and/or magnetic resonance.

With reference to FIG. 14, the mounting part 210 of the mounting device 200 may include the wireless charging module and provide wireless charging when a partial or entire region supporting wireless charging of the mounted external electronic device 1410 or 1420 is placed. For example, in case of a bar type external electronic device 1410, it may be provided with wireless charging when superimposed on the mounting part of the mounting device as shown in FIG. 14. According to another embodiment, in case of an external electronic device 1420 being foldable or having two or more displays, it may be provided with wireless charging when a partial region thereof supporting wireless charging is placed on the mount part of the mounting device as shown in FIG. 14.

FIG. 15 is an exemplary diagram illustrating mounting check of an external electronic device using a weight sensor included in a part of a mounting device according to various embodiments.

According to various embodiments, the mounting device 200 (e.g., the electronic device 101 in FIG. 1, the mounting device 400 in FIG. 4A or FIG. 4B, the mounting device 600 in FIG. 6) may include a weight sensor in the mounting part 210 (e.g., the mounting part 410 in FIG. 4A or FIG. 4B, the mounting part 620 in FIG. 6). Here, the weight sensor may include a gravity sensor, and it may be replaced with any sensor capable of detecting the weight of the external electronic device (or electronic device) (e.g., the external electronic device 700 in FIG. 7, the external electronic device 930 in FIG. 9B, the external electronic device in FIG. 10, the external electronic device in FIG. 11A or FIG. 11B) mounted on the mounting part.

With reference to FIG. 15, the weight sensor may be included in the mounting part 210 of the mounting device 200, and when the external electronic device is placed on the mounting part, the mounting part may be tilted. In case that the mounting part of the mounting device is tilted, the processor, including processing circuitry, of the mounting device may check the detection of the weight sensor and thereby identify that the external electronic device is placed on the mounting part.

According to another embodiment, the mounting part 210 of the mounting device 200 may include a pressure sensor. In an embodiment other than that shown in FIG. 15, the mounting part of the mounting device may include the pressure sensor, and when the external electronic device is mounted on the mounting part, the pressure sensor may detect the pressure (e.g., gravity) that the external electronic device presses the mounting part. In case that the pressure sensor detects the pressure applied to the mounting part, the processor of the mounting device may check the pressure detection of the pressure sensor and thereby identify that the external electronic device is placed on the mounting part of the mounting device.

With reference to FIG. 15, the mounting part 210 of the mounting device 200 may include the weight sensor or the pressure sensor. The processor of the mounting device may identify results detected through a magnetic sensor or a folding angle sensor of the mounted external electronic device in addition to the weight sensor or pressure sensor of the mounting part. Based on the identified results, the processor of the mounting device may detect a mounting state indicating whether the mounted external electronic device is folded and mounted in a state of supporting the hologram mode.

Figure 16:
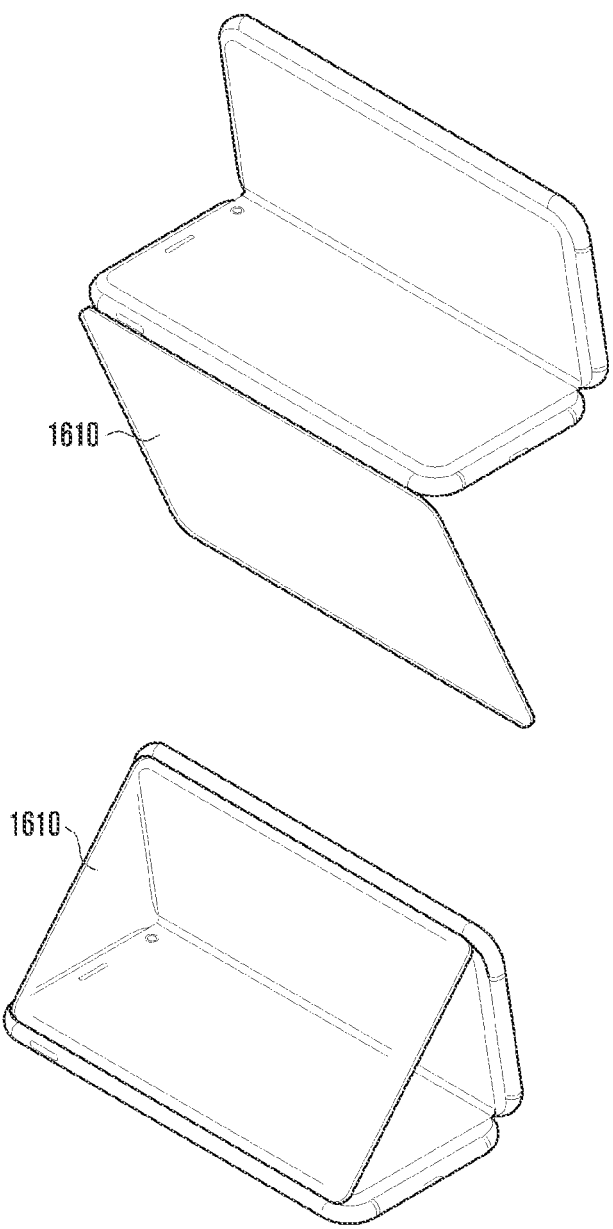
FIG. 16 is an exemplary diagram of a mounting device for providing hologram contents according to various example embodiments.

FIG. 16 is an exemplary diagram of a mounting device for providing hologram contents according to various embodiments.

According to various embodiments, the mounting device (e.g., the electronic device 101 in FIG. 1, the mounting device 200 in FIG. 2A or FIG. 2B, the mounting device 400 in FIG. 4A or FIG. 4B, the mounting device 600 in FIG. 6) for providing hologram contents by executing a hologram mode may be manufactured and supplied in the form of an accessory 1610 (e.g., a cover-type accessory).

With reference to FIG. 16, the accessory form of the mounting device may include only the film part of the mounting device of FIGS. 2A to 15. For example, the mounting device of FIG. 16 cannot be electrically connected to the external electronic device, but it can provide the output in the form of a hologram when hologram content displayed on the display (e.g., the display device 160 in FIG. 1, the display 720 in FIG. 7) of the mounted external electronic device (or electronic device) (e.g., the external electronic device 700 in FIG. 7, the external electronic device 930 in FIG. 9B, the external electronic device in FIG. 10, the external electronic device in FIG. 11A or FIG. 11B) are projected onto the film part.

With reference to FIG. 16, in case that the external electronic device (or electronic device) can support the hologram mode, the mounting device 1610 (e.g., a holder) manufactured in the form of an accessory may output, in the form of a hologram, the hologram content projected onto the film part of the mounting device from the display of the external electronic device (or electronic device).

With reference to FIGS. 8 and 16, the mounting device provided in the form of FIG. 16 may not perform the operations 810 to 830.

According to various embodiments, a mounting device may include a mounting part on which a part of an external electronic device is mounted, a film part connected to the mounting part, a short-range wireless communication module comprising communication circuitry, and a processor. The processor may be configured to detect a mounting state of the external electronic device, to identify whether the mounted external electronic device is a device supporting a hologram mode, and to, based on the identified result, transmit a transmission (control) signal to the external electronic device by using the short-range wireless communication module so that the external electronic device can output a hologram content by using at least a portion of a display of the external electronic device. The hologram content to be outputted by the external electronic device may be projected on the film part.

According to various embodiments, the mounting part may include a first magnet, the film part may include a second magnet, and the processor may be configured to detect that the external electronic device is mounted on the mounting part, when a part of the external electronic device is attached to the first magnet and the second magnet.

According to various embodiments, the processor may be configured to receive support information on whether the external electronic device is a device supporting the hologram mode, from the external electronic device through the short-range communication module in a state where the external electronic device is mounted on the mounting part.

According to various embodiments, the film part may include a touch sensor, and the processor may be configured to detect an input through the touch sensor and transmit the input to the external electronic device using the short-range wireless communication module.

According to various embodiments, the film part may include at least one button, and the processor may be configured to detect an input through the button and transmit the input to the external electronic device using the short-range wireless communication module. According to various embodiments of the disclosure, the mounting device may further include a wireless charging module.

According to various embodiments, the film part may allow the hologram content outputted by the mounted external electronic device to be projected in a hologram form. The hologram content may include at least one of video call, message transmission/reception, AOD display, music playback, album view, and emoji-related content.

According to various embodiments, the external electronic device may include at least one display, and at least one housing provided with the display. A first portion of the housing may be placed on the mounting part of the mounting device, and a second portion of the housing may be coupled to the film part of the mounting device.

According to various embodiments, a partial region of the first portion of the housing of the external electronic device placed on the mounting part of the mounting device may be attached to a first magnet included in the mounting part, and a partial region of the second portion of the housing of the external electronic device coupled to the film part of the mounting device may be attached to a second magnet included in the film part.

According to various embodiments, the mounting device may further include a weight sensor. The processor may be configured to detect a mounting state of the external electronic device on the mounting device through the weight sensor.

According to various embodiments, a method of a mounting device for mounting an external electronic device may include detecting a mounting state of the external electronic device mounted on the mounting device through a processor of the mounting device, identifying support information from the external electronic device whether the mounted external electronic device is a device supporting a hologram mode, based on the identified result, transmitting a transmission signal to the external electronic device using a short-range wireless communication module of the mounting device so that the external electronic device outputs a hologram content using at least a part of a display of the external electronic device, and projecting the hologram content outputted from the external electronic device receiving the transmission signal onto the film part of the mounting device.

According to various embodiments, the detecting may include detecting, through a processor of the mounting device, that a part of the external electronic device is attached to a first magnet included in a mounting part of the mounting device and a second magnet included in a film part of the mounting device.

According to various embodiments, the identifying may include receiving the support information on whether the external electronic device is a device supporting the hologram mode using a short-range wireless communication module of the mounting device in a state where the external electronic device is mounted on the mounting part of the mounting device, and identifying the support information through the processor of the mounting device.

According to various embodiments, the projecting may include changing the hologram content in response to an input through a touch sensor or a button included in the film part of the mounting device received by the external electronic device, and projecting the hologram content outputted from the external electronic device in a form of a pseudo hologram.

According to various embodiments, an electronic device may include a display, a wireless communication module, a sensor module, a processor, and a memory operatively connected (directly or indirectly) to the processor. The processor may be configured to identify a result of detecting through the sensor module that the electronic device is folded at a predetermined angle and mounted on a mounting device, or identify a result of detecting through the sensor module that a part of the electronic device is attached to a magnet included in the mounting device, to transmit support information to the mounting device through the wireless communication module upon receiving a signal for identifying whether the electronic device supports the hologram mode, from the mounting device through the wireless communication module, and to display a hologram content on first and second regions of the display to be projected onto a film part of the mounting device upon receiving a hologram content transmission signal from the mounting device through the wireless communication module.

According to various embodiments, the electronic device may include two or more separate displays or may be a foldable electronic device. The display may be divided into a first region and a second region of the display based on the separated or folded region. According to various embodiments, the electronic device may further include a sub-display, and the processor may control the hologram content displayed on the film part of the mounting device through the sub-display. The hologram content may include at least one of video call, message transmission/reception, AOD display, music playback, album view, or emoji-related content.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. The electronic devices according to embodiments of the disclosure are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 and/or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., module or program) of the above-described components may include a singular or a plurality of entities, and some of the plurality of entities may be separately disposed in any other component. According to various embodiments, one or more components or operations among the above-described components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly, or heuristically, or one or more of the operations may be executed in a different order or omitted, or one or more other operations may be added.

What is claimed is:

1. A mounting device comprising:
   a mounting part on which a part of an external electronic device is to be mounted;

a film part connected to the mounting part;
a short-range wireless communication module comprising communication circuitry; and
a processor,
wherein the processor is configured to:
  detect a mounting state of the external electronic device,
  identify whether the mounted external electronic device is a device supporting a hologram mode, and
  based on the identified result, control to transmit a transmission signal to the external electronic device via at least the short-range wireless communication module so that the external electronic device can output a hologram content via at least a portion of a display of the external electronic device so that the hologram content to be outputted by the external electronic device can be projected on the film part of the mounting device.

2. The mounting device of claim 1, wherein the mounting part includes a first magnet,
the film part includes a second magnet, and
the processor is configured to detect that the external electronic device is mounted on the mounting part, when a part of the external electronic device is attached to the first magnet and the second magnet.

3. The mounting device of claim 2, wherein the processor is configured to receive support information on whether the external electronic device is a device supporting the hologram mode, from the external electronic device through the short-range communication module at least in a state where the external electronic device is mounted on the mounting part.

4. The mounting device of claim 3, wherein the film part includes a touch sensor, and
the processor is configured to detect an input via at least the touch sensor and control to transmit the input to the external electronic device via at least the short-range wireless communication module.

5. The mounting device of claim 3, wherein the film part includes at least one button, and
the processor is configured to detect an input through the button and control to transmit the input to the external electronic device using the short-range wireless communication module.

6. The mounting device of claim 2, wherein the external electronic device includes:
at least one display; and
at least one housing,
wherein a first portion of the housing is configured to be placed on the mounting part of the mounting device, and
a second portion of the housing is configured to be coupled to the film part of the mounting device.

7. The mounting device of claim 6, wherein a partial region of the first portion of the housing of the external electronic device to be placed on the part of the mounting device is to be attached to a first magnet included in the mounting part, and
a partial region of the second portion of the housing of the external electronic device to be coupled to the film part of the mounting device is configured to be attached to a second magnet included in the film part.

8. The mounting device of claim 1, further comprising:
a wireless charging module comprising charging circuitry.

9. The mounting device of claim 1, wherein the film part is configured to allow the hologram content to be outputted by the mounted external electronic device to be projected in a hologram form.

10. The mounting device of claim 1, further comprising:
a weight sensor,
wherein the processor is configured to detect a mounting state of the external electronic device on the mounting device via at least the weight sensor.

11. A method of a mounting device for mounting an external electronic device, the method comprising:
detecting a mounting state of the external electronic device mounted on the mounting device via at least a processor;
identifying support information from the external electronic device indicating whether the mounted external electronic device is a device for supporting a hologram mode;
based on the identified result, transmitting a transmission signal to the external electronic device using a short-range wireless communication module, comprising communication circuitry and/or at least one antenna, of the mounting device so that the external electronic device outputs a hologram content using at least a part of a display of the external electronic device; and
projecting the hologram content outputted from the external electronic device receiving the transmission signal onto the film part of the mounting device.

12. The method of claim 11, wherein the detecting includes detecting, through the processor, which is a processor of the mounting device, that a part of the external electronic device is attached to a first magnet included in a mounting part of the mounting device and a second magnet included in a film part of the mounting device.

13. The method of claim 12, wherein the identifying includes receiving the support information using a short-range wireless communication module of the mounting device in a state where the external electronic device is mounted on the part of the mounting device, and identifying the support information through the processor of the mounting device.

14. The method of claim 13, wherein the projecting includes:
changing the hologram content in response to an input through a touch sensor and/or a button included in the film part of the mounting device received by the external electronic device; and
projecting the hologram content outputted from the external electronic device in a form of a pseudo hologram.

15. An electronic device comprising:
a display;
a wireless communication module comprising communication circuitry;
a sensor module comprising at least one sensor;
a processor; and
a memory operatively connected to the processor,
wherein the processor is configured to:
  identify a result of detecting through the sensor module that the electronic device is folded at a predetermined angle and mounted on a mounting device, and/or identify a result of detecting through the sensor module that a part of the electronic device is attached to a magnet included in the mounting device,
  control to transmit support information to the mounting device through the wireless communication module based at least on receiving a signal for identifying whether the electronic device supports the hologram mode, from the mounting device through the wireless communication module, and control to display a hologram content on first and second regions of the display to be projected onto a film part of the mounting device based at least on receiving a hologram content transmission signal from the mounting device through the wireless communication module.

16. A system comprising a mounting device and an electronic device, the system comprising:

the mounting device including a mounting part on which a part of the electronic device is mounted;

the mounting device further including: a film part connected to the mounting part, a short-range wireless communication module comprising communication circuitry, and a processor;

wherein the processor is configured to:

detect a mounting state of the electronic device, identify whether the mounted electronic device is a device supporting a hologram mode, and based on the identified result, control to transmit a transmission signal to the electronic device via at least the short-range wireless communication module so that the electronic device can output a hologram content via at least a portion of a display of the electronic device so that the hologram content to be outputted by the electronic device can be projected on the film part of the mounting device.

* * * * *